(12) United States Patent
Affolter et al.

(10) Patent No.: US 11,839,323 B2
(45) Date of Patent: Dec. 12, 2023

(54) SET FOR USE IN THE PREPARATION OF A BEVERAGE BY MEANS OF A BEVERAGE PREPARATION DEVICE

(71) Applicant: DELICA AG, Birsfelden (CH)

(72) Inventors: Roland Affolter, Möriken (CH); Tim Thilla, Weil am Rhein (DE); Markus Brönnimann, Hermrigen (CH)

(73) Assignee: Delica AG, Birsfelden (CH)

( * ) Notice: Subject to any disclaimer, the term of this patent is extended or adjusted under 35 U.S.C. 154(b) by 812 days.

(21) Appl. No.: 16/492,402

(22) PCT Filed: Mar. 12, 2018

(86) PCT No.: PCT/EP2018/056069
§ 371 (c)(1),
(2) Date: Sep. 9, 2019

(87) PCT Pub. No.: WO2018/162758
PCT Pub. Date: Sep. 13, 2018

(65) Prior Publication Data
US 2021/0127888 A1    May 6, 2021

(30) Foreign Application Priority Data

Mar. 10, 2017 (EP) .................................... 17160245
Mar. 10, 2017 (EP) .................................... 17160248

(51) Int. Cl.
*A47J 31/06* (2006.01)
*B65D 85/804* (2006.01)
*A47J 31/46* (2006.01)

(52) U.S. Cl.
CPC .......... *A47J 31/0673* (2013.01); *A47J 31/46* (2013.01); *B65D 85/8049* (2020.05)

(58) Field of Classification Search
CPC .... A47J 31/0673; A47J 31/46; A47J 31/4492; A47J 31/0663; A47J 31/407;
(Continued)

(56) References Cited

U.S. PATENT DOCUMENTS 9,167,933 B2 * 10/2015 Carr .................... A47J 31/3628
2013/0055904 A1 * 3/2013 DeMiglio ........... A47J 31/0689
99/300
(Continued)

FOREIGN PATENT DOCUMENTS

EP    1440638 B1    7/2008
EP    1715778 A1    10/2010
(Continued)

OTHER PUBLICATIONS

European Office Action issued in corresponding European Patent Application No. 17 160 245.1 dated Jul. 26, 2019.
(Continued)

*Primary Examiner* — Dana Ross
*Assistant Examiner* — Joseph W Iskra
(74) *Attorney, Agent, or Firm* — Finch & Maloney PLLC

(57) ABSTRACT

A set (47), for use in the preparation of a beverage by a beverage preparation device, comprising a capsule (2) and an adapter (1). The adapter (1) and the capsule (2) are interconnected in a stand-by position such that the adapter (1) and the capsule (2) can be transferred, from the stand-by position, into an operating position in which the inlet (8) of the adapter (1) is in fluid connection with the substance chamber (49) of the capsule (2).

15 Claims, 16 Drawing Sheets

(58) Field of Classification Search
CPC .. A47J 31/085; A47J 31/0689; A47J 31/0631; A47J 31/061; A47J 31/4403; A47J 31/0668; A47J 31/0647; A47J 31/0642; A47J 31/0678; A47J 31/22; A47J 31/4485; A47J 31/467; A47J 31/446; A47J 31/14; A47J 31/4425; A47J 31/4489; A47J 31/4467; B65D 85/8049; B65D 85/8058; B65D 85/8052; B65D 85/8043; B65D 25/205; B65D 85/804; B65D 65/466; B65D 85/8064; B65D 85/8055; B65D 85/8061; B65D 85/8046; B65D 75/5883; B65D 51/226; B65D 51/223; B65D 81/3211; B65D 85/8067; B65D 81/3288; B65D 77/2024; B65D 77/24; B65B 29/022; B65B 67/02; B65B 51/225; B65B 43/00; B29C 45/372; G06K 19/06046; G06K 19/06018; G06K 19/06028; A23F 5/262; A23F 3/18; A23L 2/395; A23L 2/52; A23L 2/54; A23L 2/39; A23L 2/00; B67D 1/04; B67D 7/0227; B67D 7/0233; B67D 1/0079; B67D 1/0022; B67D 1/0046; B67D 1/045; B67D 1/0078; A23C 9/00; A23G 1/56
USPC .......................................................... 99/295
See application file for complete search history.

(56) References Cited

U.S. PATENT DOCUMENTS

2014/0290493 A1    10/2014   Rivera
2015/0059588 A1*   3/2015    Castellani ........... A47J 31/0668
                                                                99/295

FOREIGN PATENT DOCUMENTS

| EP | 2 401 945 A1 | 1/2012 | |
|----|----|----|----|
| EP | 2409609 A1 | 1/2012 | |
| EP | 2709499 B1 | 3/2015 | |
| GB | 2475290 A * | 5/2011 | .............. A47J 31/46 |
| WO | 02082962 A1 | 10/2002 | |
| WO | 2005/079638 A1 | 9/2005 | |
| WO | 2010066705 A1 | 6/2010 | |
| WO | 2011/058329 A1 | 5/2011 | |
| WO | 2011069830 A1 | 6/2011 | |
| WO | 2011092301 A1 | 8/2011 | |
| WO | 2012/062842 A1 | 5/2012 | |
| WO | 2013/072239 A1 | 5/2013 | |
| WO | 2013/117990 A1 | 8/2013 | |
| WO | 2013153526 A1 | 10/2013 | |

OTHER PUBLICATIONS

International Search Report Corresponding to PCT/EP2018/053174 dated Mar. 13, 2018.
International Search Report Corresponding to PCT/EP2018/052345 dated Feb. 28, 2018.
International Search Report Corresponding to PCT/EP2018/056069 dated May 11, 2018.
Written Opinion Corresponding to PCT/EP2018/053174 dated Mar. 13, 2018.
Written Opinion Corresponding to PCT/EP2018/052345 dated Feb. 28, 2018.
Written Opinion Corresponding to PCT/EP2018/056069 dated May 11, 2018.

* cited by examiner

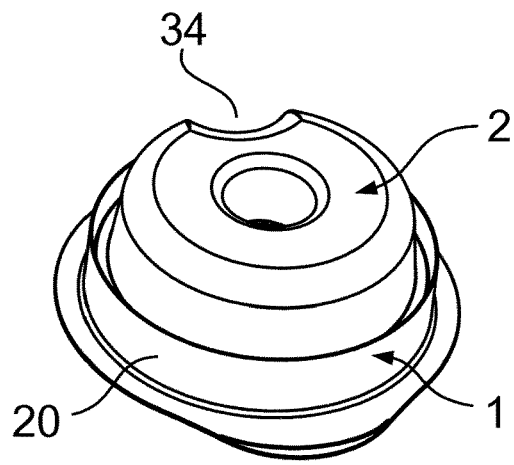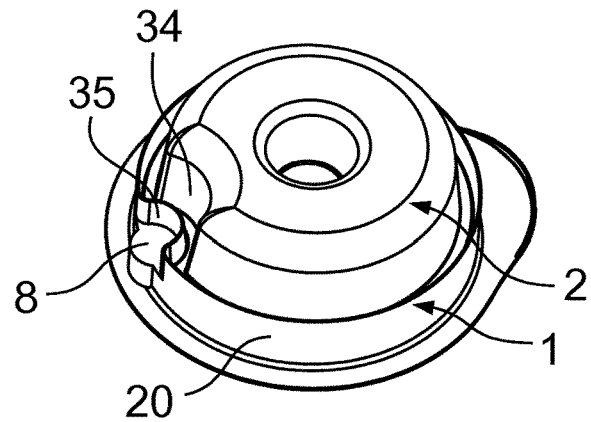
Fig. 9              Fig. 10
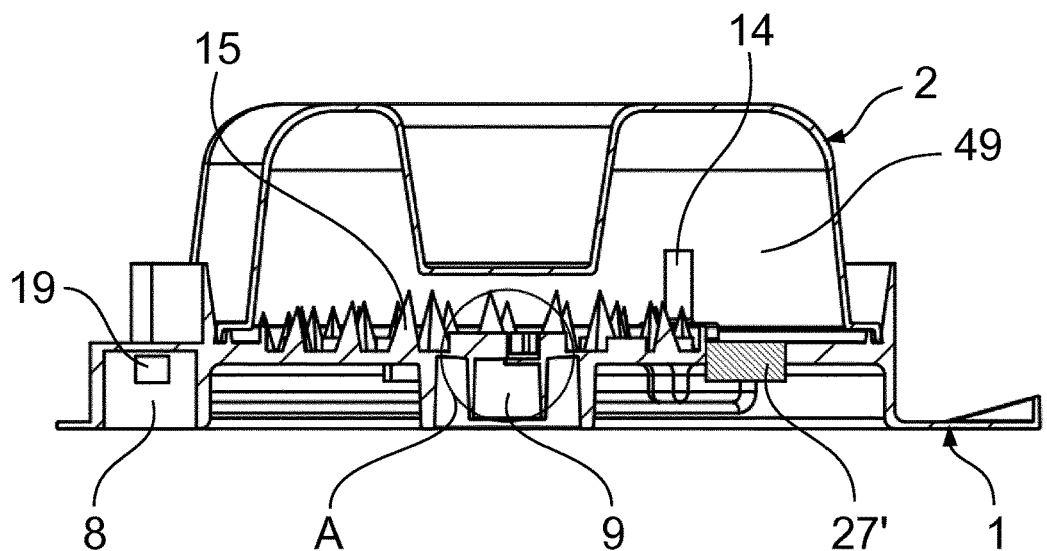
Fig. 11
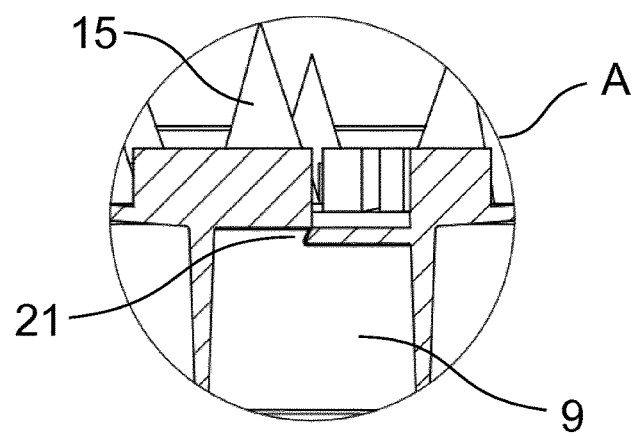
Fig. 12

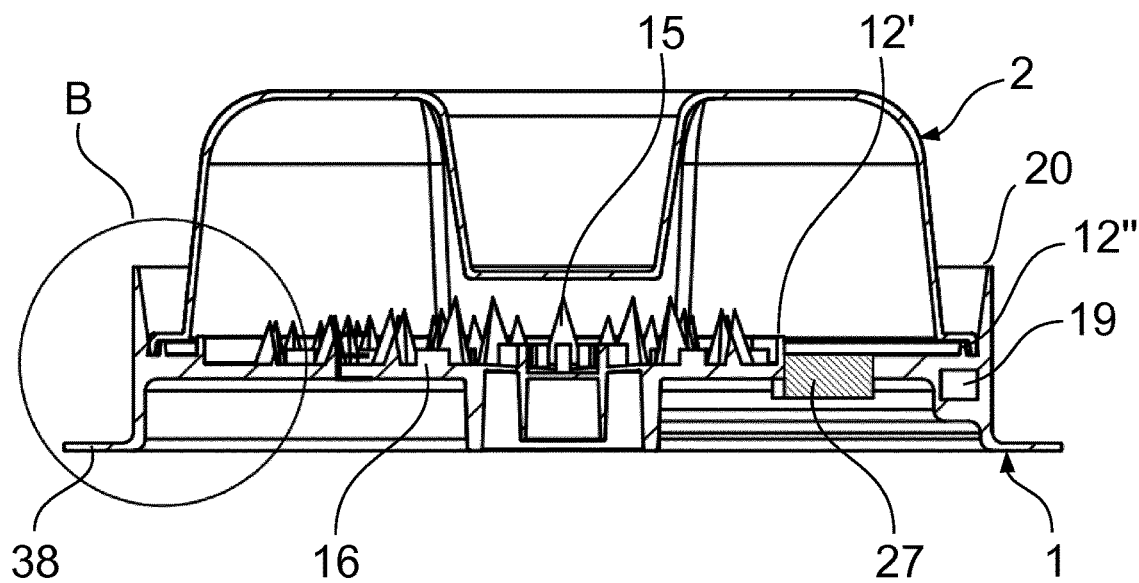
Fig. 13
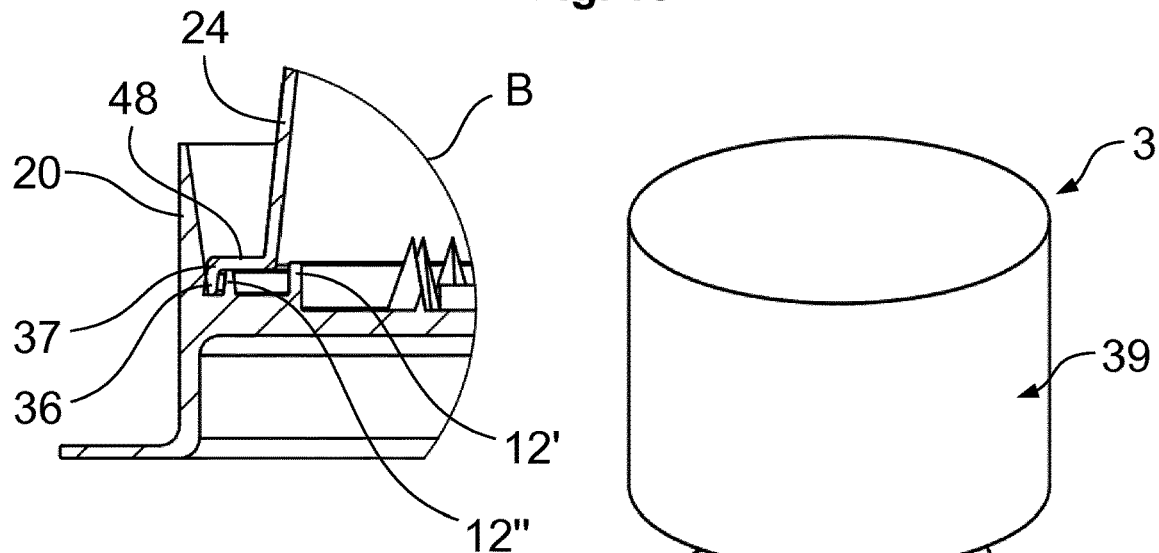
Fig. 14
Fig. 15

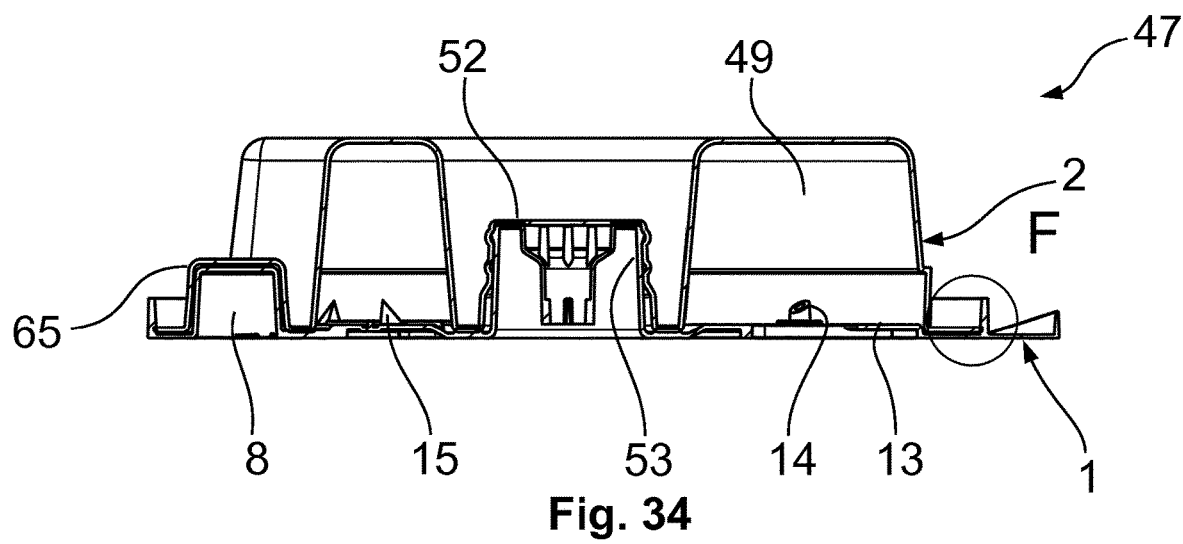
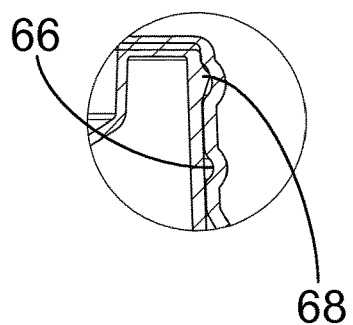
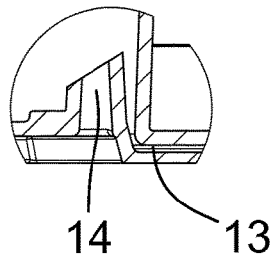
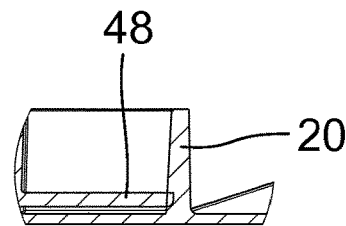
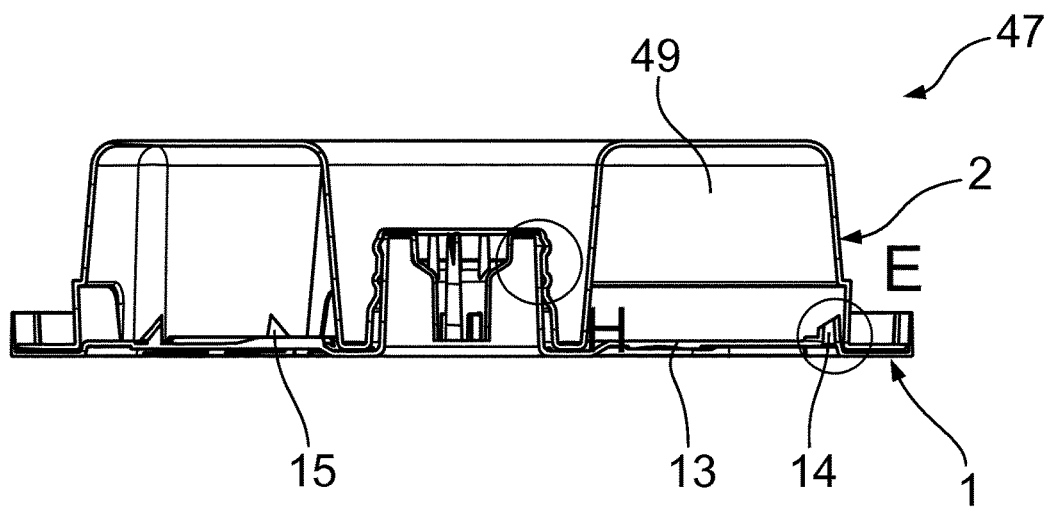

SET FOR USE IN THE PREPARATION OF A BEVERAGE BY MEANS OF A BEVERAGE PREPARATION DEVICE

This application is a National Stage completion of PCT/EP2018/056069 filed Mar. 12, 2018, which claims priority from European patent application serial no. 17160245.1 filed Mar. 10, 20172017 and European patent application serial no. 17160248.5 filed Mar. 10, 2017.

FIELD OF THE INVENTION

The present invention relates to a set comprising an adapter and a capsule for use in the preparation of a beverage by means of a beverage preparation device, wherein the adapter can be placed together with the capsule into the beverage preparation device.

BACKGROUND OF THE INVENTION

A multiplicity of different portion packs and systems for producing beverages are known in the prior art. In particular, capsules are frequently used for preparing different not beverages, especially coffee or tea, but also milkshakes, in the home. Such capsules, which are designed as disposable products, conventionally comprise a capsule body for receiving the beverage ingredients and a cover covering tire capsule body. The ingredients acre generally roasted and ground coffee beans, but sometimes are also dried tea leaves. However, soluble products in general or concentrates are also suitable. During the actual preparation, pressurized water is conducted through the capsule, as a result of which the material contained in the chamber is extracted or dissolved.

More recently, the number of commercially available beverage preparation systems based on capsules of the abovementioned type has increased significantly. Each of the systems generally comprises capsules of different configuration and size. In order to make it possible for a user to use a capsule of one system with a beverage preparation device of another system, various adapters are also obtainable, for example, EP 2 401 945 A1 describes an adapter device for a beverage preparation device. Said adapter device provides a receiving space which is adapted to the outer contour of a capsule and into which said capsule can be placed. After the receiving space has been closed with a cover, the adapter device together with the capsule can be placed into a capsule holder of the beverage preparation device, which capsule holder is designed for a different type of capsule. The adapter device provides means for introducing a liquid into the capsule and means for discharging a liquid from the capsule, which means correspond with the means of the beverage preparation device. This adapter device provides a possibility of using a capsule by means of beverage preparation devices of different systems.

However, said adapter device has the disadvantage of having to be of multi-part design because of the fact that the capsule is completely enclosed. Furthermore, the device leads to a comparatively large reduction in the available volume of the capsule holder. Also, is can be used only in combination with an individual type of capsule since the receptacle is adapted exactly to the outer contour of the capsule, hot leant, the use of such an adapter device is awkward since, after the beverage has been prepared, the seer has to open the adapter device in order to remove the capsule from the receptacle thereof.

SUMMARY OF THE INVENTION

It is therefore an object of the present invention to overcome the abovementioned disadvantages in the prior art. In particular, it is an object of the present invention to provide a set consisting of adapter and capsule for use in the preparation of a beverage by means of a beverage preparation device, which set can be manufactured and used more simply and more cost-effectively. The set is intended, in particular to provide greater user friendliness.

These objects are achieved by a set which has the features as claimed in the independent claim(s). Said set is suitable for use in the preparation of a beverage by means of a beverage preparation device, wherein the set comprises a capsule surd an adapter and can be placed into the beverage preparation device. The capsule comprises a capsule body with an in particular flange-like edge, a cover which is attached to the edge and closes the capsule body, in particular hermetically, in order to form a substance chamber. In the substance chamber, the capsule contains a substance for the preparation of the beverage. Said substance can be a dry substance, for example coffee powder or milk powder, and/or a beverage concentrate. The adapter has a capsule side and a device side. Means for introducing a liquid into the capsule and means for discharging a liquid from the capsule are arranged on the capsule side. An inlet for a liquid provided by the beverage preparation device and also an outlet are arranged on the device side. The inlet is fluidically connected ho the means for introducing the liquid into the capsule and the outlet is fluidically connected to the means for discharging the liquid from the capsule. The adapter and the capsule are connected and in particular preassembled in the standby position in such a manner that they can be brought out of the standby position, in particular toward each other, into an operating position. In said operating position, the inlet of the adapter and the substance chamber of the capsule are fluidically connected to each other.

Owing to the set consisting of capsule and adapter being preassembled, the user friendliness is substantially increased. The set can simply be inserted Hire a conventional capsule into the beverage preparation device. The use of a set consisting of capsule and adapter permits a high degree of modularity which permits simple adaptation to different beverage preparation devices, to different requirements of the beverage substances used for the preparation and to the desired beverage. A set of this type consisting of adapter and capsule in particular affords the advantage that the capsule can be constructed significantly more simply than capsules which are conventionally used in comparable applications. As a result, the process and the system for filling such a capsule with a beverage substance turn out to be simpler. Furthermore, it is simpler to produce such a capsule in an oxygen-tight design.

The capsule can be configured in a simple manner and can be configured in particular without complex contours or structures. By means of the configuration with a flange-like edge, the cover can be mounted a simple manner and the capsule closed. The cover can be formed from a composite structure, in particular comprising an aluminum fell and nonwoven material. The aluminum foil imparts the tightness to the composite structure that is required to hermetically close the capsule body. By means of the use of a nonwoven material in the composite structure, a filter function can additionally be obtained when the aluminum foil is penetrated or burst. However, a design without nonwoven material is likewise also conceivable, for example when milk concentrate is used as the beverage substance. Alternatively to the composite structure, a plastics film or a composite structure having a plurality of layers of different materials, such as, for example, plastic or aluminum, can also be used. Instead of aluminum, use can also be made of a multi-layered composite structure composed of PET/SiOx/ PP (a polyethyleneterephthalate/silicon oxide barrier film/ polypropylene) both for the capsule and for the cover. The capsule can also be manufactured from aluminum. The flange-like edge can have an encircling collar which extends beyond the cover in a direction transversely with respect to the cover. Such a configuration of the capsule is advantageous in particular if, depending on the configuration of sealing elements on the adapter, a tight connection to the adapter has to be produced even at the outer edge of the capsule body.

The outer casing of the capsule can be oxygen- and/or aroma-tight. By means of an oxygen-tight design of the outer casing, penetration of oxygen info the capsule during the storage of a beverage substance contained therein can be substantially avoided. In a corresponding manner, aging of the beverage substance, for example coffee powder, due to oxidation can be avoided. An oxygen-fight capsule is generally also aroma-tight. Flavorings contained in the beverage substance are therefore substantially prevented from escaping during the storage of said beverage substance inside the capsule.

Oxygen- and/or aroma-tightness is required in order, particularly in the case of coffee, to achieve a shelf life of 12 months, preferably 18 months. Accordingly, in the present connection, an oxygen- and/or aroma-tight capsule is understood as meaning a capsule in which coffee powder can be stored for a duration of at least 12 months, preferably at least 18 months, at room temperature in atmospheric air without a change to the coffee powder occurring that would significantly impair the quality of a coffee beverage produced therefrom.

The capsule body or the entire capsule can have a surface-modified oxygen transmission rate (OTR) in $cm^3$ per $m^2$ per day per 0.21 bar of less than 20, preferably less than 10, preferentially less than 5. The OTP indicates what amount of oxygen per surface and time unit diffuses through the capsule body.

The adapter has the advantage that both the introduction of liquid into the capsule and the discharging of same from the capsule take place on only one side of the capsule. The adapter thus does not have to completely enclose the capsule and can be designed so be structurally significantly simpler. A complicated placing of the capsule into the adapter is dispensed with. Furthermore, it is possible within certain limits to use capsules of different size and configuration with one and the same adapter since the size and shape of the capsule are not fixedly predetermined by said adapter. This makes it possible, inter alia, to adapt the quantity of a beverage substance used wish a capsule to the respective recipe in order to prepare a beverage. By means of the use of an adapter, machine-specific arrangements of the supply of liquid and the removal of beverage can be adapted to the requirements of the capsule.

The adapter can be substantially disk-shaped.

In the standby position, the adapter can be preassembled on the capsule in such a manner that the cover of the capsule is held at a distance from the capsule side of the adapter, and the means for introducing the liquid into the capsule and the means for discharging the liquid from the capsule cannot communicate with the substance chamber of the capsule. Accordingly, the cover is still intact and the capsule is closed. Depending on the configuration of the capsule and the selected material, the capsule is therefore aroma-tight and the beverage substance is protected from contact with oxygen.

The capsule side of the adapter has a structure for securing and/or positioning the capsule. Said structure can be configured in the form of an encircling collar. Such a structure ensures that the adapter is positioned correctly on the capsule for preparing the beverage. The structure connects adapter and capsule to each other before the preparation of the beverage, and therefore said adapter and capsule can be placed together as a set or unit into the beverage preparation device. This simplifies the handling for a user. Instead of or in addition to the encircling collar, latching can also be provided in the center of the capsule can of one adapter by means of a suitable structure.

The collar preferably comprises an indentation for engaging in a recess of the capsule. A desired mutual orientation of adapter and capsule can thereby also be ensured and maintained for the transport.

The structure can have latching means, in particular in the form of an entirely or partially encircling groove and/or a lug, to which the capsule is preassembled such that it can be latched and/or pressed in, in particular at its flange-like edge, preferably to an encircling collar. It is likewise conceivable that, instead of an encircling collar, only individual latching segments are present which interact with the flange-like edge of the capsule. The capsule can thus be held in the standby position in which the cover of the capsule is held at a distance from the capsule side and in front of the means for introducing and discharging a liquid. Preassembly oy means of latching means is particularly simple and can be efficiently integrated in a production process or in the packaging process.

The center of the capsule body can have a preferably hollow-cylindrical offset at which the capsule is latched to a corresponding projection on the adapter. The substance chamber of the capsule or the capsule itself can have an annular or donut-shaped configuration. Such latching in the center of the capsule body cam be provided alternatively or in combination with latching on the encircling collar.

It is also conceivable for the capsule to change from a standby position into an operating position, for example, only in the edge region, while the capsule and the adapter maintain their relative positions in the central region. For example, the capsule is deformed by the change from the standby position into the operating position. The capsule is configured in a correspondingly flexible manner. Similarly, the capsule can change from a standby position into an operating position only in the central region and can maintain a fixed position relative to the adapter in the edge region.

Apart from by latching means, the adapter can also be preassembled on the capsule by a frictional connection, welding, adhesive bonding, sealing or via predetermined breaking points and also by combinations of these possibilities. Such types of preassembly require other or at most no specific structural adaptation of the adapter to the capsule, or vice versa. Accordingly, the production of the adapter, or of the capsule can be further simplified and optimized. However, it is also conceivable for the adapter and the capsule to be connected to each other in an integrally bonded manner in the standby position and in the operating position. For example, bending feints, snap-in or folding elements which make such a change from a standby position into an operating position are conceivable.

The adapter, can be preassembled on the capsule in such a manner that adapter and capsule can be pressed under action of a pressing force from the standby position into an operating positron in which adapter and capsule can communicate fluidically and in particular tire ruler of the adapter is fluidically connected to the substance chamber of the capsule. Conventionally, capsules are enclosed in a capsule holder upon placing into a beverage preparation device. The adapter and the capsule can accordingly be configured and preassembled in such a manner that, when the capsule holder of the beverage preparation device is closed, both are brought from the standby position into the operating position. The inlet of the adapter is therefore fluidically connected to the substance chamber of the capsule. A liquid prepared by the beverage preparation device, generally water, can be inserted via the inlet of the adapter and the means for introducing the liquid into the substance chamber of the capsule.

The capsule side of the adapter can have an introducing region, in which the means for introducing the liquid into the capsule are arranged, and/or a discharging region, in which the means for discharging the liquid from the capsule are arranged. The introducing region and/or the discharging region can be bounded by at least one sealing element by means of which at least one tight connection to the cover of the capsule can be produced in the operating position. As a result, an unintentional escape of liquid at the transition from the adapter to the capsule during the production of beverages can be effectively avoided, in particular, the introducing region and the discharging region con be separated from each ocher by at least one sealing element by means of which a sealing connection to the cover of the capsule can be produced. An undesirable overflowing of liquid from the introducing region info the discharging region without passing through the capsule can thereby be effectively avoided.

The adapter, optionally including the sealing element, can be produced as a single piece, in two pieces or else three pieces, in particular by injection molding, preferably from a plastics material. By means of the single-piece design, the structural complexity of the adapter is further reduced, as a result of which the latter can be produced more cost-effectively. In particular, injection molding is very readily suitable for mass production.

Penetration elements for producing as least one opening in the cover in an operating position can be arranged on the capsule side of the adapter, said penetration elements being directed toward the cover of the capsule. Such penetration elements permit and simplify a fluidic communication between adapter and capsule.

The means for introducing the liquid into the capsule can be designed as at least one penetration element for penetrating the cover of the capsule. As a result, a liquid path into the capsule can be produced in a reliable manner. In particular, the means for introducing the liquid into the capsule can be designed as at least one puncture cannula. Such a puncture cannula is particularly readily suitable for introducing a liquid into the capsule since, after penetrating the cover, the liquid can be conducted through the puncture cannula into the interior of the capsule. This can result in the formation of a directed jet which can be injected in a targeted manner into the substance chamber of the capsule. Of course, it is also conceivable for the puncture cannula to be provided on its puncture side with a jet-forming device which ensures uniform distribution of the injected liquid in the substance chamber of the capsule. However, the at least one penetration element can also be selected from a list consisting of a pyramid, a cone, a truncated pyramid, a truncated cone, at cylinder and a prism.

The at least one penetration element can be designed in such a manner that, when the capsule and the adapter are placed into the beverage preparation device and the device is closed, the cover of the capsule can be penetrated by the at least one penetration element. As a result, the penetration of the cover can be facilitated for the user since said penetration can take place using the beverage preparation device when the actual capsule fielder is closed. Furthermore, the capsule is opened only immediately before the preparation of a beverage, which effectively avoids contamination or leaking of the contents thereof.

The means for discharging the liquid from the capsule can be designed as at least one, preferably a plurality of, penetration element(s), in particular selected from a list consisting of pyramids, spikes, cones, truncated pyramids, truncated cones, cylinders and prisms, tor penetrating the cover of the capsule, ouch penetration elements constitute an effective means for penetrating the cover and therefore for producing a liquid path for discharging the liquid from the capsule. By means of the configuration of the penetration elements as pyramids, spikes, cones, truncated pyramids, truncated cones, cylinders or prisms, the opening process can be consciously controlled. In particular, it can be determined whether the opening is produced by an internal pressure in the capsule interior or by the movement from the standby posit lens into the operating position. In addition, it can be determined whether an opening once produced is further enlarged under the internal pressure of the capsule or remains the same. If a plurality of penetration elements are used, the cover can be penetrated at a plurality of points. It has been established that the undesirable formation of preferred liquid paths within the beverage substance in the interior of the capsule (what is referred to as channeling) can be avoided by the multiple penetration of the cover. As a result, good percolation or extraction of the beverage substance contained in the capsule can be ensured.

The means for discharging the liquid from the capsule can be designed, in particular additionally, as at least one, preferably a plurality of, supporting element(s), in particular selected from a list consisting of pyramids, cones, truncated pyramids, truncated cones, cylinders and prisms. The at least one supporting element can be designed in such a manner that, after the capsule and the adapter are placed into the beverage preparation device, the cover of the capsule rests on the supporting element. By means of an internal pressure of the capsule that is built up during preparation of a beverage, the cover can then be brought to buret, an particular in addition to being penetrated when a beverage preparation device is closed. In this manner, in particular in the case of coffee beverages, particularly high quality can be obtained since the liquid is first introduced info the capsule and the beverage substance is wetted by compression of the air contained in the capsule before a liquid path is created for discharging the liquid from the capsule. Furthermore, the burst and optionally additionally also penetrated cover can likewise fake on the function of a filter element.

The means for discharging the liquid from, the capsule on the capsule side of the adapter can comprise at least one collecting channel which, in the operating position, form, a fluid duct together with the cover of the capsule. By means of the formation, of a duct, the liquid emerging from the capsule is collected and discharged in a targeted manner. An uncontrolled dripping after the preparation of the beverage has finished is prevented or at least reduced. In addition, there can be a plurality of collecting channels which are directed toward the center of the adapter from ail or from some of the penetration elements.

The means for discharging the liquid from the capsule, the outlet and optionally also the discharging region can be arranged in the center of the adapter. This makes it possible that, depending on the design of the beverage preparation machine, a receptacle for the prepared beverage, for example a coffee cup, can be placed in a manner centered centrally directly below the adapter and the capsule.

The means for introducing the liquid into the capsule, the inlet and optionally also the introducing region can be arranged in an edge region of the adapter. The means for introducing a liquid into the capsule are preferably designed as an in particular encircling duct or a channel. As a result, the center of the adapter can be kept free for other parts. Furthermore, when, for example, a plurality of puncture cannulas are used, better distribution of the liquid over the beverage substance contained in the capsule can be obtained.

The projector of the adapter can have a rising channel which, in the operating position, together with the corresponding offset of the capsule forms a rising duct which leads to the outlet of the adapter and therefore to the device side thereof. A rising duct in the flow path of the beverage, which rising duct is arranged before the actual outlet, prevents or reduces dripping after the preparation of a beverage has finished.

The rising channel can be configured in such a manner that, together with the offset of the capsule, if forms ah outlet nozzle for forming a beverage jet. The formation of a beverage jet provides an additional possibility of influencing the properties of the prepared beverage.

An air inlet opening, in particular an air inlet slot, can be arranged in the region of the outlet nozzle in such a manner that the beverage jet can entrain air. Accordingly, the dispensed beverage is mixed with air. In particular during the production of a coffee beverage, frothing may be desired. Also during the production of a milk beverage, frothing is frequently desired, for example for a cappuccino or a latte macchiato.

In the outlet, the adapter can have an impact wall toward which tire outlet nozzle is directed. A beverage jet will therefore strike against said impact wall, thus resulting in additional mixing of the beverage with air. Such an impact wall also leads to a uniform configuration of the beverage and air mixture.

The outlet can have a constriction, in particular a gap. By means of this configuration of the outlet, an increased shearing action can be obtained during the passage of a liquid. In particular during the production of coffee beverages, this permits an improved crema, as is typical in particular of espresso beverages. If the constriction is designed in the form of a gap, this can additionally administer the function of a valve which opens only as the liquid pressure within the capsule increases and therefore prevents premature escape of the beverage. This permits in particular prebrewing of a beverage substance in order to prepare a coffee beverage. The adapter accordingly avoids dispensing of the liquid drop by drop and permits only continuous dispensing. In addition, dripping of liquid after a beverage has been prepared can be avoided if the capsule together with the adapter is removed as a set from the beverage preparation device.

A collecting duct can be arranged around the projection of the adapter. Said collecting duct collects the beverage escaping from the capsule, and therefore the latter can be supplied in a targeted manner to the outlet.

The capsule body of the capsule can be a thermoformed part, for example made of plastic or aluminum. It is likewise conceivable for the capsule body to be an injection molded part. The adapter is preferably an injection molded part. The capsule body and the adapter are both preferably composed of plastic. The selection of the material, and the production, method largely influence the production costs of the set. At the same time, by producing the capsule body by thermoforming, the possibility is created of advantageously producing an aroma-tight and/or oxygen-tight capsule in high piece numbers. By contrast, production of the adapter by injection ridding opens up possibilities of forming complex structures both in high piece numbers and with great precision. This is helpful in particular when the adapter is configured with an air inlet opening and an impact wall in the outlet.

The device side of the adapter can have at least one machine-readable code which can be read by a beverage preparation device, in particular for setting the operating parameters thereof, when, the adapter is placed together with the capsule into the beverage preparation device.

Alternatively thereto, the capsule side in the case of the adapter can have at least one machine-readable code which can be read by a beverage preparation device, in particular for setting the operating parameters thereof. For this purpose, the adapter can be in particular at least, partially transparent in such a manner that the machine-readable code can be read by the beverage preparation device when the adapter is placed together with the capsule into the beverage preparation device.

As a result, in beverage preparation systems which make recourse to one or more machine-readable codes tor setting the operating parameters of a beverage preparation device, a desired setting of the operating parameters can take place despite the use of an adapter. Furthermore, the provision of one or more machine-readable codes on the adapter has the advantage that different beverage preparation programs (i.e. sets of operating parameters; for example tor espresso or lungo coffee) can be carried out using a single type of capsule. Greater flexibility can thus be obtained in the production of beverages. Furthermore, a reading error in the event of possible soiling of the machine-readable code, which may impair the readability thereof, can thus be avoided or corrected.

The machine-readable code can be a 1D or a 2D code, it the code is a 1D code, it can be a barcode. If the code is a 2D code, it can be a stacked code, for example a coda block, a code 49, or a PDF417. However, matrix codes, such as a QR code, a data matrix, a maxicode or an aztec code are also suitable. However, point codes or composite codes are also suitable. All other optoelectronically readable typefaces and color markings or tactile codings are also suitable, however, for use in combination with the present invention.

Alternatively thereto, the adapter can also have at least one window through which a machine-readable cede mounted on the cover of the capsule can be read by the beverage preparation device, in particular for seating the operating parameters thereof, when the adapter is placed together with the capsule into the beverage preparation device. This configuration of the adapter ensures that, when a capsule is used, the correct parameters are always set at the beverage preparation device irrespective of the type of adapter used. Confusion which could result in the setting of erroneous operating parameters at the beverage preparation device is therefore effectively avoided.

Alternatively to the above-described design, the adapter can also be formed transparently at least in regions such that a machine-readable code mounted on the cover of the capsule can be read by the beverage preparation device, in particular for setting the operating parameters thereof, when the adapter is placed together with the capsule into the beverage preparation device.

The at least one machine-readable code, the at least one window or the at least one transparent region can foe arranged on the device side in such a manner that a line which connects the outlet to the center of the machine-readable code, the window or the transparent region, and a line which connects the inlet to the outlet, are separated by a minimum angle spacing of 70°. By means of an angle spacing of the window or of the transparent region from the outlet of greater than or equal to 70°, soiling of the machine-readable code, the window or the transparent region can be particularly effectively avoided.

A further aspect of the present invention relates to a beverage preparation system comprising a set as described above and a beverage preparation device.

BRIEF DESCRIPTION OF THE DRAWINGS

Further advantages and individual features of the present invention emerge from the description below of a plurality of exemplary embodiments and from the drawings, in which, schematically:

FIGS. 9 and 10 show a perspective illustrations of a set in an operating position;

FIG. 11 shows a sectional view through the set according to FIGS. 9 and 10;

FIG. 12 shows an enlargement of the partial region A from FIG. 11;

FIG. 13 shows an alternative sectional view through the set according to FIGS. 9 and 10;

FIG. 14 shows an enlargement of the partial region B from FIG. 13;

FIG. 15 shows a perspective overall view of a set and of a beverage preparation device (partially illustrated);

FIG. 34 shows the sectional view according to FIG. 29, wherein the set is in the operating position;

FIG. 35 shows an enlargement of the partial region F from FIG. 34;

FIG. 36 shows the sectional view according to FIG. 31, herein the set is in the operating position;

FIG. 37 shows an enlargement of the partial region F from FIG. 36;

FIG. 38 shows an enlargement of the partial region H from FIG. 36;

DETAILED DESCRIPTION OF THE PREFERRED EMBODIMENTS

Figure 1:
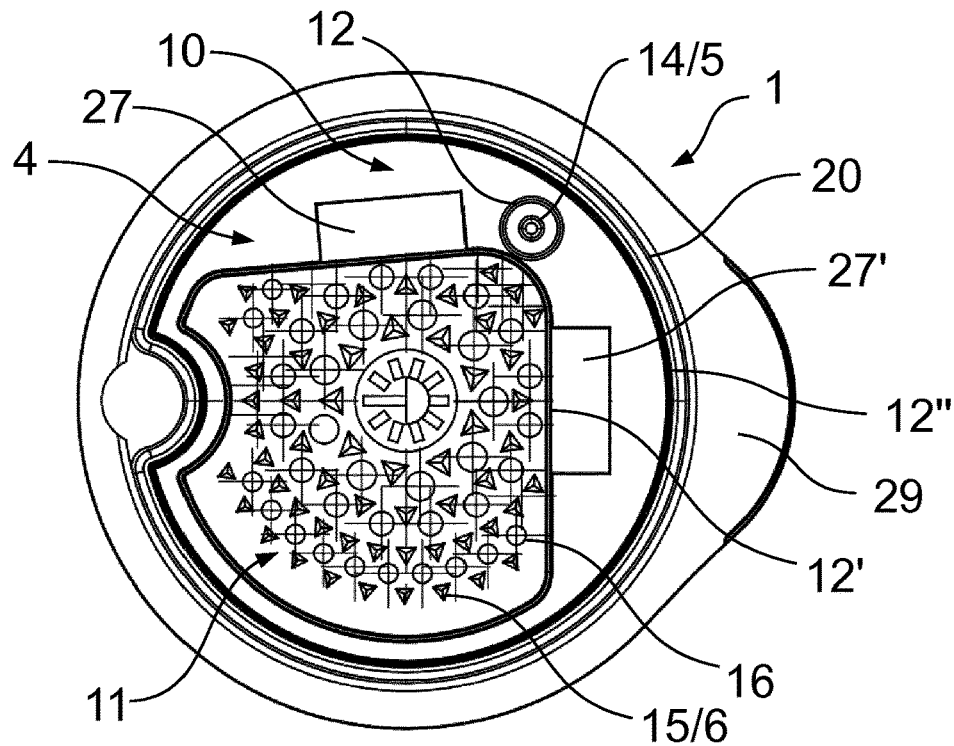
FIG. 1 shows a top view of an adapter from the capsule side.

FIG. 1 shows a top view of an adapter 1 with details of a capsule side 4. It can be seen that the adapter 1 has a substantially circular shape and a tab 29. The tab 29 serves firstly as a gripping element for a user and secondly for aligning the adapter 1 in a beverage preparation device 3 (see FIG. 15). The capsule side 4 of the adapter 1 has a discharging region 11 and an introducing region 10. The discharging region 11 is surrounded by a sealing element 12' which at the same time separates the introducing region 10 from the discharging region 11. Furthermore, a puncture canola 14 as a means 5 for introducing a liquid into a capsule 2 (see FIG. 8) is arranged on the capsule side 4. The puncture canola 14 is surrounded by a sealing element 12. The discharging region 11 has a multiplicity of penetration elements in the form of triangular pyramids 15. In addition to said pyramids 15, supporting elements in the form of truncated cones 16 are also arranged in the discharging region 11. The triangular pyramids 15 together with the truncated cones 16 form a means 6 for discharging a liquid from a capsule. For the positioning of a capsule 2 (see FIG. 8) on the adapter 1, the latter has an encircling collar 20. Furthermore, there are two transparent regions 27, 27' through which a code on the cover 13 (see FIG. 7) of a capsule placed onto the adapter 1 can be machine-read from a device side of the adapter 1.

Figure 2:
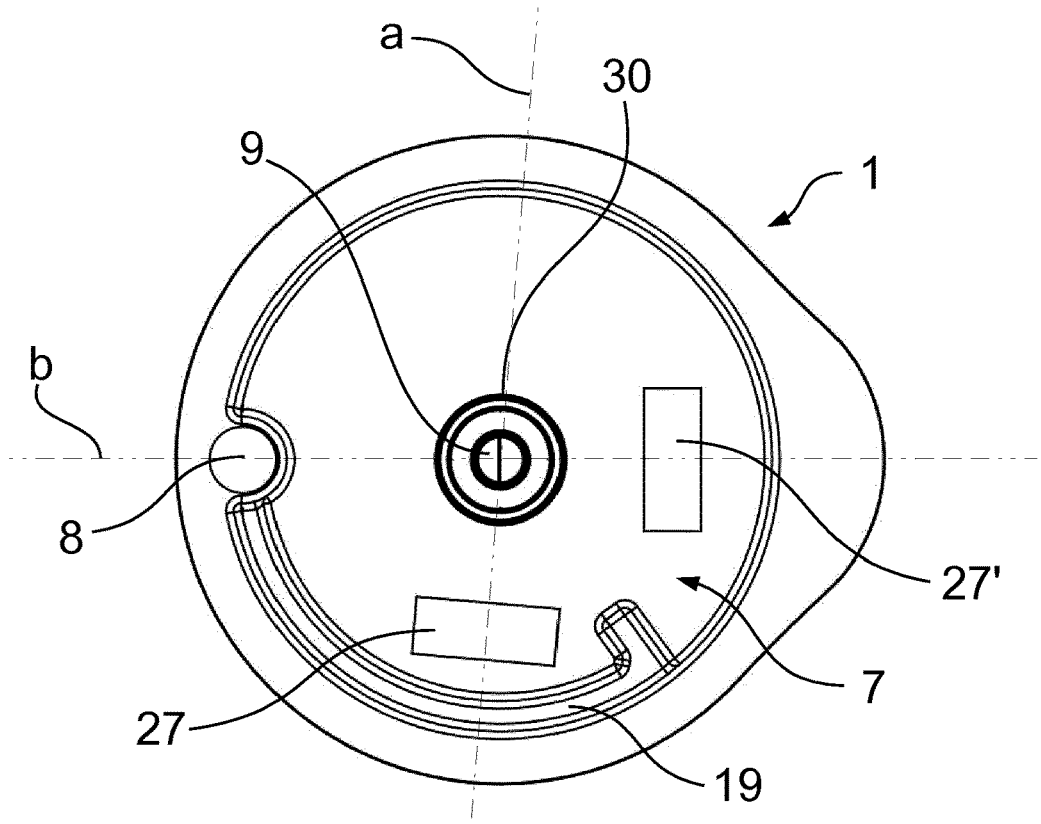
FIG. 2 shows a fop view of an adapter from the device side.

FIG. 2 shows a top view of a device side 7 of the adapter 1 with the transparent regions 27, 27'. Furthermore, an outlet 9 which is surrounded by an encircling collar 30 can be seen. An inlet 8 of the adapter 1 is arranged in the periphery of the latter and opens into a closed dues 19, of which only the outer contour can foe seen in the present figure. The transparent region 27 is arranged in such a manner that the line a which connects the outlet 9 to a center of the transparent region 27 and a line b which connects the inlet 8 to the outlet 9 are separated by an angle spacing of 85° or 95°.

Figure 3:
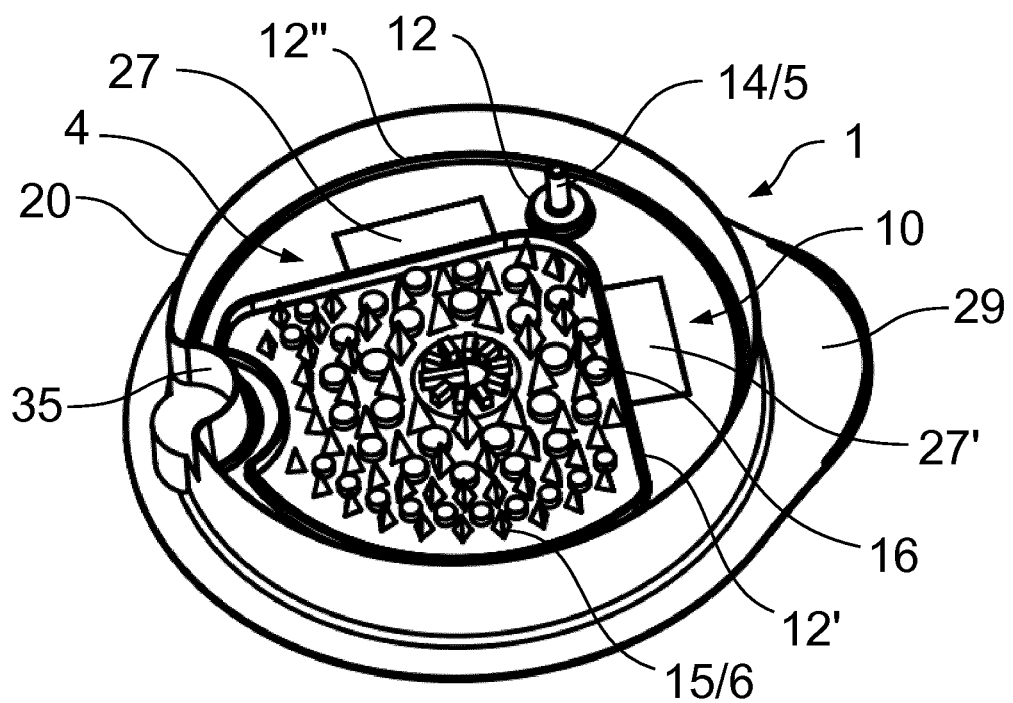
FIG. 3 shows a perspective illustration of an adapter from the capsule side.
Figure 4:
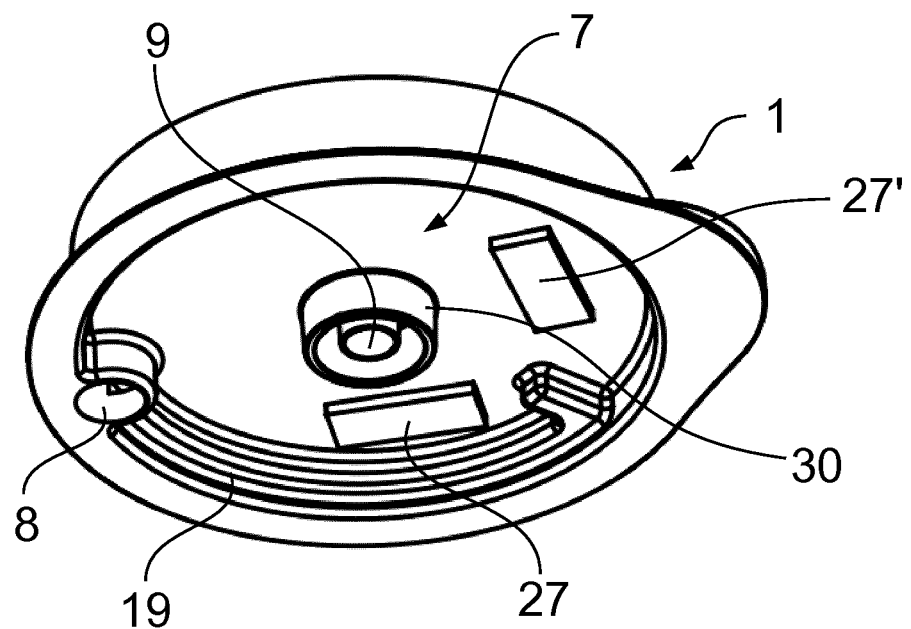
FIG. 4 shows a perspective illustration of an adapter from the device side.

FIGS. 3 and 3 additionally show the capsule side and device side of the adapter 1 in a perspective illustration. It can be seen that the adapter 1 is substantially dish-shaped. In addition, an indentation 35 in the encircling collar 20 of the adapter 1 can be seen. The reference signs are identical to those in FIGS. 1 and 2, and reference is made to the corresponding description.

Figure 5:
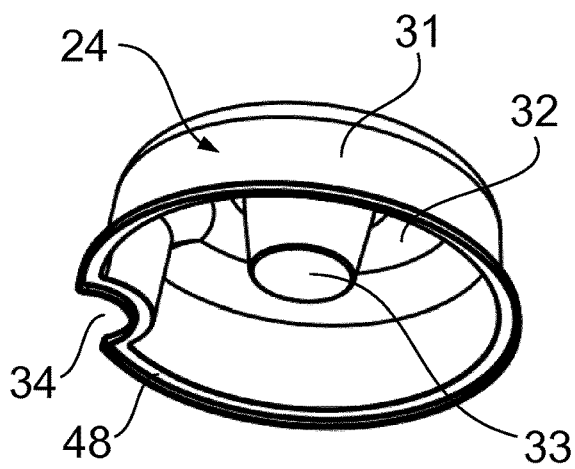
FIGS. 5 and 6 show perspective illustrations of a capsule body of a capsule for use with an adapter.
Figure 6:
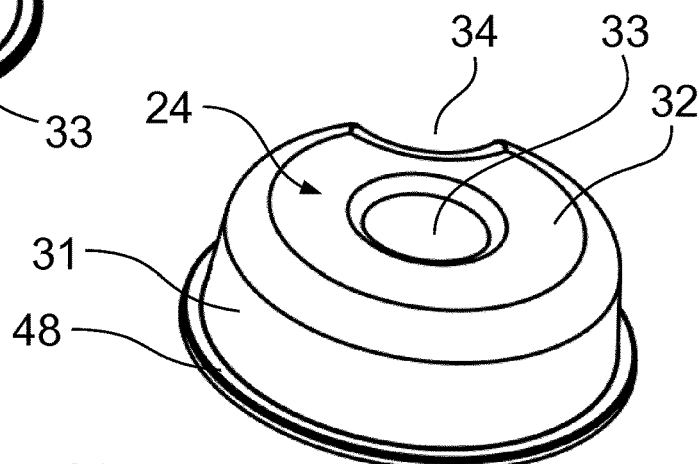

FIGS. 5 and 6 show a capsule body 24 for a capsule 2 (see FIG. 7), which is provided for use with an adapter 1 (see FIGS. 1 to 4), from taro different perspectives. The capsule body 24 comprises a side wall 31 and a base 32. The base 52 has a circular elevation 33 which extends in the direction of the capsule opening. Furthermore, the side wall 31 and pars of the base 32 is provided with a lateral recess 34. The side wall 31 of the capsule body 24 is closed with a flange-like edge 48 on which a cover 13 (see FIG. 7) in the form of a closure film for closing the capsule body 24 can be sealed.

Figure 7:
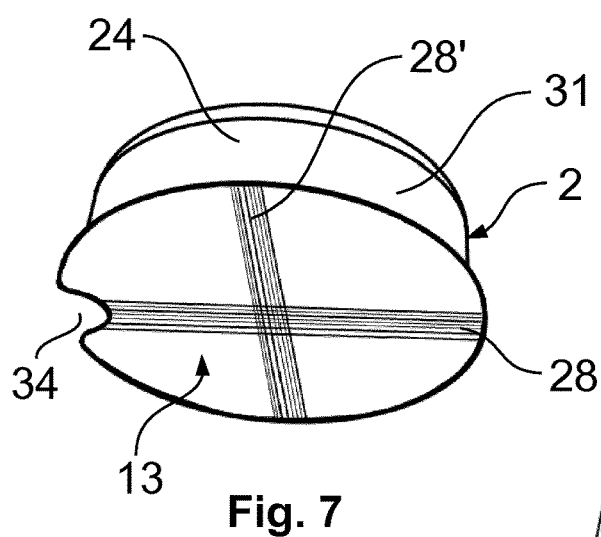
FIG. 7 shows a perspective illustration of a capsule for use with an adapter.
Figure 8:
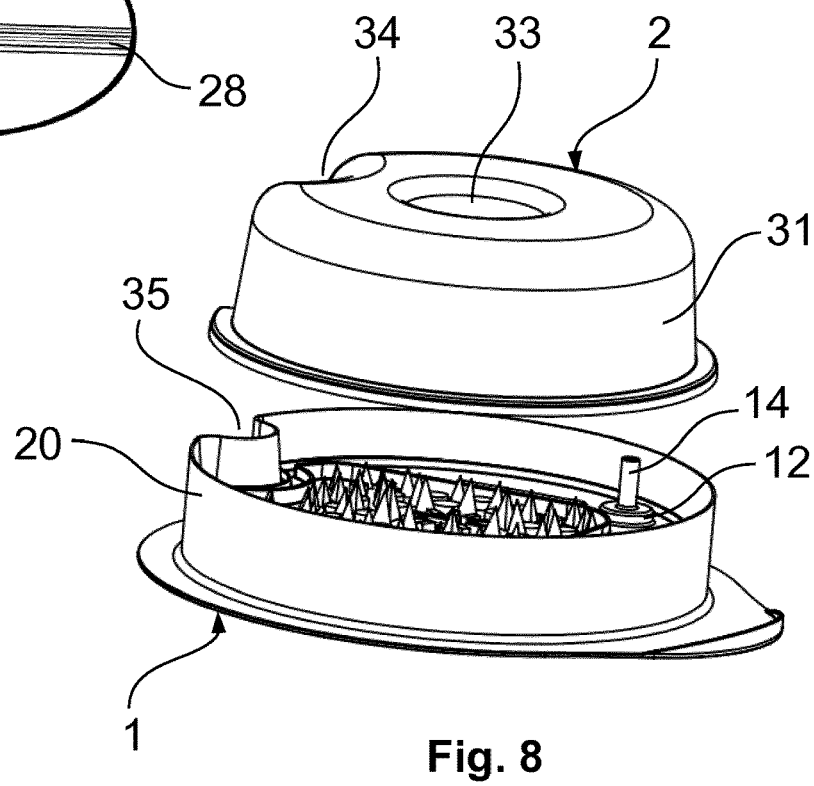
FIG. 8 shows a perspective overall view of a set consisting of adapter and capsule prior to the preassembly thereof.

FIG. 7 slows a perspective illustration of a capsule 2 for use with an adapter 1 (see FIG. 8) with an attached cover 13. The capsule body 21 is closed with the cover 13. Two intersecting bar codes 28, 28' are printed on the cover 13. The capsule body 21 together with the cover 13 fonts a substance chamber for receiving a beverage substance for producing a beverage. The lateral recess 31 which is not only formed in the side wall 31 but also in the cover 13 is furthermore apparent, FIG. 8 shows a set consisting of an adapter 1 and a capsule 2 provided for use with said adapter 1 in an overall view prior to the preassembly thereof. It can be seen that the recess 31 in the side wall 31 of the capsule 2 corresponds to an indentation 35 of the encircling collar 20 of the adapter 1. In addition to an exact positioning of the capsule 2 on the adapter 1, a desired alignment of said capsule is therefore also obtained. Also apparent on the capsule 2 is the central elevation 33 and on the adapter 1 is the puncture cannula 14 which is directed toward the capsule 2 and is surrounded by a sealing element 12.

In FIGS. 9 and 10, the capsule 2 is placed onto the adapter 1 and is centered in the operating position. It can be seen in particular in FIG. 10 that the recess 31 of the capsule 2 and the indentation 35 of the encircling collar 20 of the adapter 1 also provide the required space for the inlet 8, FIG. 11 illustrates a sectional view through the set according to FIGS. 9 and 10. The capsule 2 is placed onto the adapter 1 and the set is in the operating position. For better clarity, the cover 13 (see FIG. 7) of the capsule 2 is emitted. The sectional plane runs along the straight line b (see FIG. 2) through the inlet 8, the outlet 9 and the transparent region 27'. It can readily be seen in the present illustration that the inlet 8 opens into the duct 19. It can also be seen that the transparent region 27' is formed by a cuboid element composed of a transparent material, which is inserted into a recess in the adapter 1. The pyramids 15 and the puncture cannula 14 reach into the substance chamber 43 of the capsule 2. A partial region A is illustrated in enlarged form in FIG. 12.

FIG. 12 shows more precise details of the partial region A of FIG. 11. It can be seen that the opening for the liquid into the outlet 9 is designed as a gap 21. During the preparation of coffee beverages, the shearing forces of said gap produce a cress typical of an espresso. Furthermore, the gap 21 carries out a valve function and opens only at a certain liquid pressure. An unintentional dripping of liquid after a beverage has been prepared can therefore be prevented when the capsule together with the adapter is removed from, the beverage preparation device. A pyramid 15 as the penetration element can likewise be clearly seen in FIG. 12.

FIG. 13 shows an alternative sectional view through the set with a capsule 2, which is placed onto an adapter 1, according to FIGS. 9 and 10. In this case, the sectional, plane runs along the straight line a which runs virtually perpendicularly to the straight line a (see FIG. 2). The transparent region 27 is correspondingly apparent here. Furthermore, a further portion of the duct 13 can be seen. The pyramids 15 and a plurality of truncated cones 16, on which the cover 13 (see FIG. 7) of the capsule 2 can rest, can also be seen. The adapter 1 is encircled by a flange-like edge 38. On the side lacing the capsule 2, the adapter 1 has a sealing elements 12' which separates the discharging region 11 (see FIG. 1) with its pyramids 15 and truncated cones 16 from the introducing region 10 (see FIG. 1). A further sealing element 12" is arranged on the adapter 1 next to its encircling collar 20 and forms a tight connection between capsule 2 and adapter 1. A partial region B is illustrated in enlarged form in FIG. 14.

FIG. 14 shows an enlargement of the partial, region B according to FIG. 13. It can be seen that the capsule body 24 comprises a flange-like edge 48. The outer region 37 of the latter has an encircling extension 36 which runs substantially parallel to the side weal 31 (see FIGS. 3 and 6), i.e. transversely with, respect to the flange-like edge 48, and extends beyond, the cover 13 (see FIG. 7). When the capsule 2 is placed onto the adapter 1 and is in the operating position, the encircling extension 36 engages in a groove formed by the encircling collar 20 and the sealing element 12" of the adapter 1. The encircling extension 36 of the capsule body 24 enters into a tight connection with the adapter 1. At the same time, the sealing element 12" enters into a tight connection with the flange-like edge 48 of the capsule body 24. The cover 13 (see FIG. 7) of the capsule 2 is omitted in FIGS. 13 and 14. However, if is provided to attach such a cover in a centered manner on the flange-like edge 48 of the capsule body 24 such shat said cover does not fall between the sealing element 12" and the capsule body 24 or between the encircling extension 36 and the adapter 1. It has been shown that this would significantly reduce the sealing action. In the case of the exemplary embodiment shown, it is provided shat the cover 13 of the capsule 2 additionally enters into a tight connection with the sealing element 12'.

Figure 16:
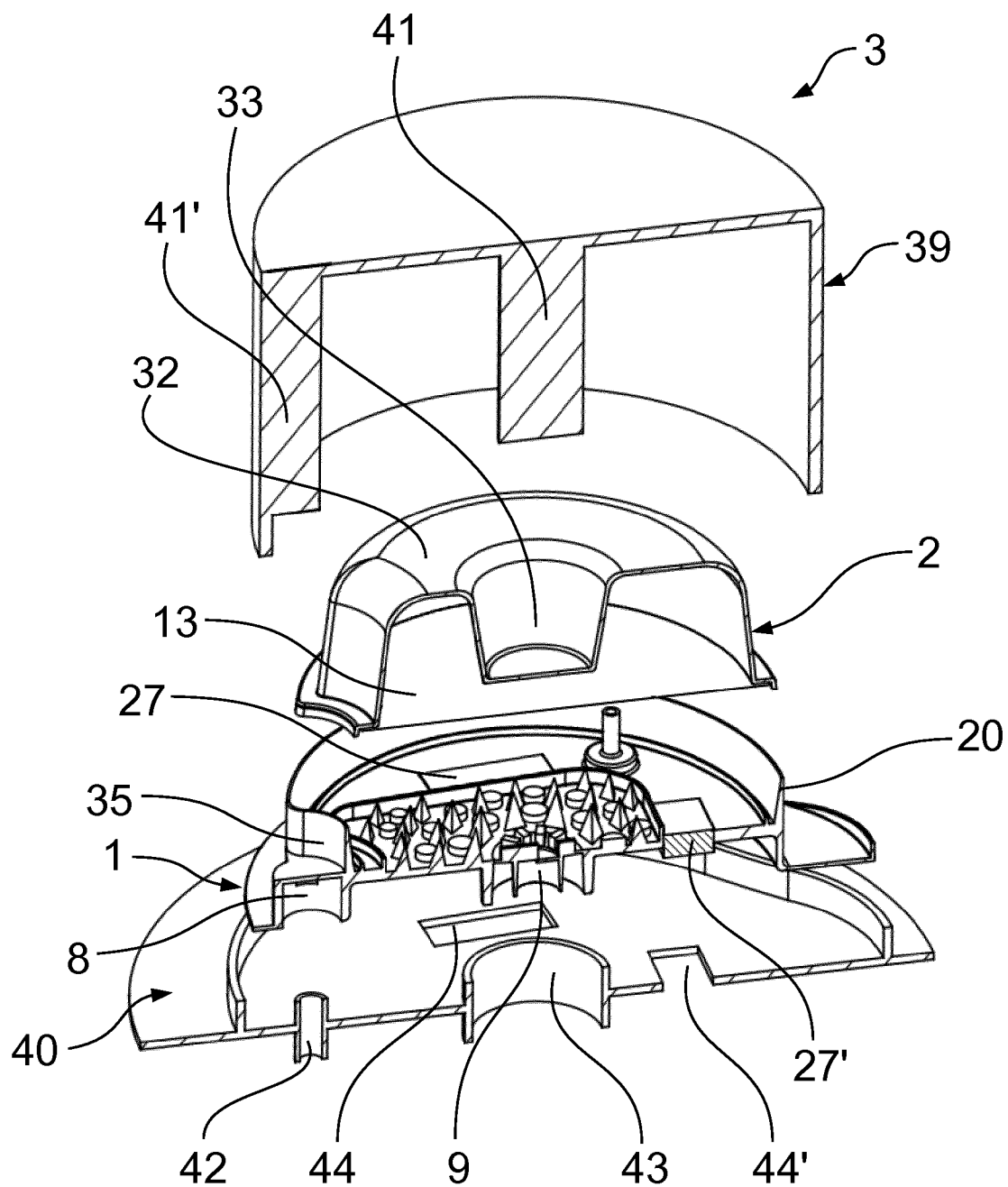
FIG. 16 shows a perspective sectional view of the overall view according to FIG. 15.

FIG. 15 shows a perspective overall view of a set and of an upper part 39 and a lower part 40 of a capsule holder of a beverage preparation device 3, wherein the capsule 2 and the adapter 1 are illustrated individually, FIG. 16 shows a perspective sectional view of the overall view according to FIG. 15. It can be seen that the upper part 39 of the capsule holder has two punches 41, 41'. A punch 41 engages from the upper side in the illustration in the elevation 33 of the base 32 of the capsule 2. A punch 41' engages in the indentation 35 of the encircling collar 20 of the adapter 1. The lower part 40 of the capsule holder has an inflow stub 42 which engages in the inlet 8 of the adapter 1 and via which a pressurised liquid can be provided. Furthermore, the lower part 40 of the capsule holder has an outflow stub 43 in which the outlet 9 of the adapter 1 can engage. The lower part 40 of the capsule holder furthermore has two readings windows 44, 44' via which a reading device which is part of the beverage preparation device 3 can read a machine-readable code, which is mounted on the cover 13 of the capsule 2, for example a bar code 28, 28' (see FIG. 7) through the two transparent regions 27, 27' of the adapter 1.

Figure 17:
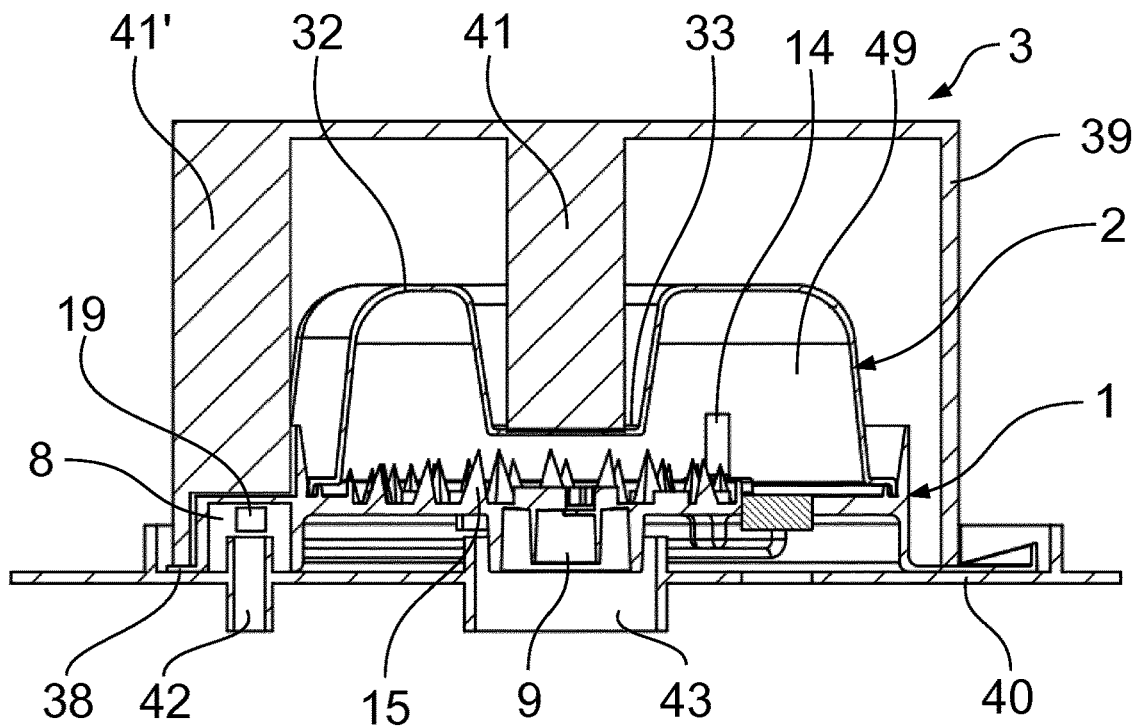
FIGS. 17 and 18 show sectional views of the overall view according to FIG. 15, wherein the set is illustrated in the operating position.
Figure 18:
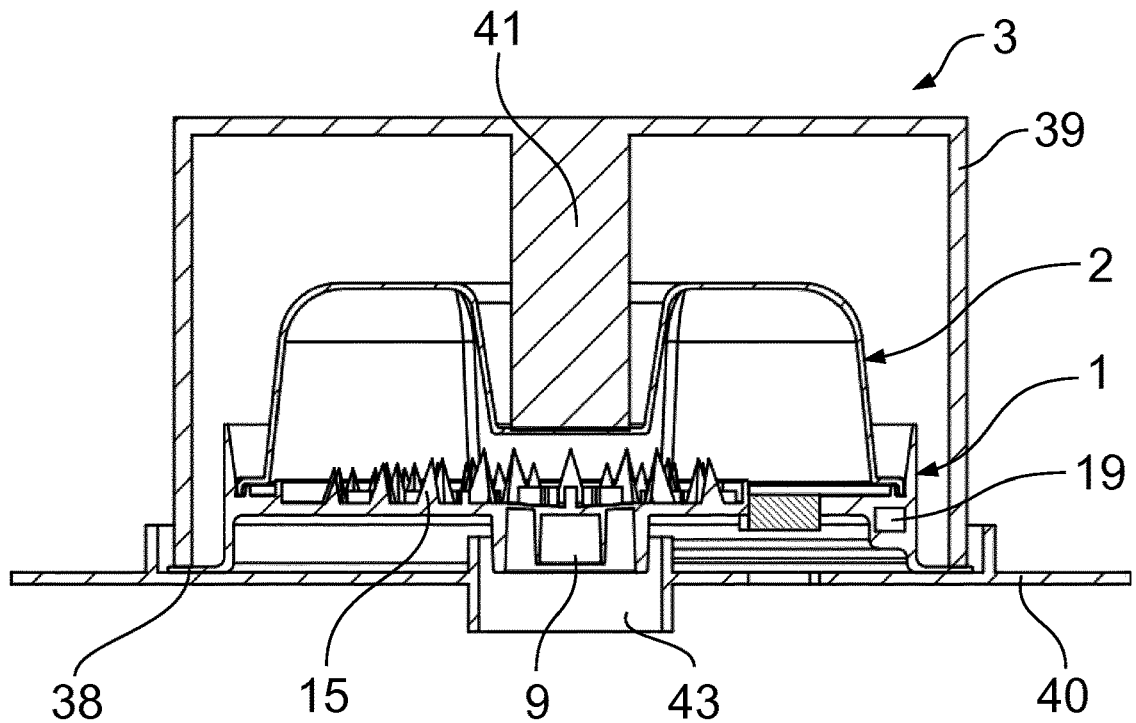

FIGS. 17 and 18 show sectional views of the overall view according to FIG. 15, wherein the set is illustrated in its operating position. The adapter 1 is enclosed with a capsule 2 in the upper part 39 and lower part 40 of the capsule holder of a beverage preparation, device 3. It can be seen that the flange-like edge 38 of the adapter 1 is clamped between the upper part 39 and the lower part 40 of the capsule holder, and therefore the latter is closed in a sealing manner. Furthermore, it can be seen how the punch 41 acts on the lower side of the elevation 33 in the capsule base 32. The capsule 2 is thus pressed onto the adapter 1, and therefore the sealing elements 12, 12', 12" (see FIG. 3) and the encircling extension 36 (see FIG. 13) together with the cover 13 (see FIG. 7) of the capsule 2 close in a sealing manner. Furthermore, the punch 41 presses onto the inlet 8 of the adapter 1. The transition from the inflow stub 42 to the inlet 8 is thus sealed. For better clarity, the cover of the capsule is omitted in FIGS. 17 and 18. A liquid infected through the inlet stub 42 by the beverage preparation device 3 passes into the inlet 8 of the adapter 1 and further through the oust 19 to the puncture cannula 14 which projects through the cover (not illustrated) of the capsule 1 into the substance chamber 49. A prepared beverage passes through the openings, which are produced by the pyramids 15, in the cover (not illustrated) into the discharging region 11 (see FIG. 1) of the adapter and therefore to the outlet 9 which is arranged in the outlet stub 43 of the beverage preparation device.

Figure 19:
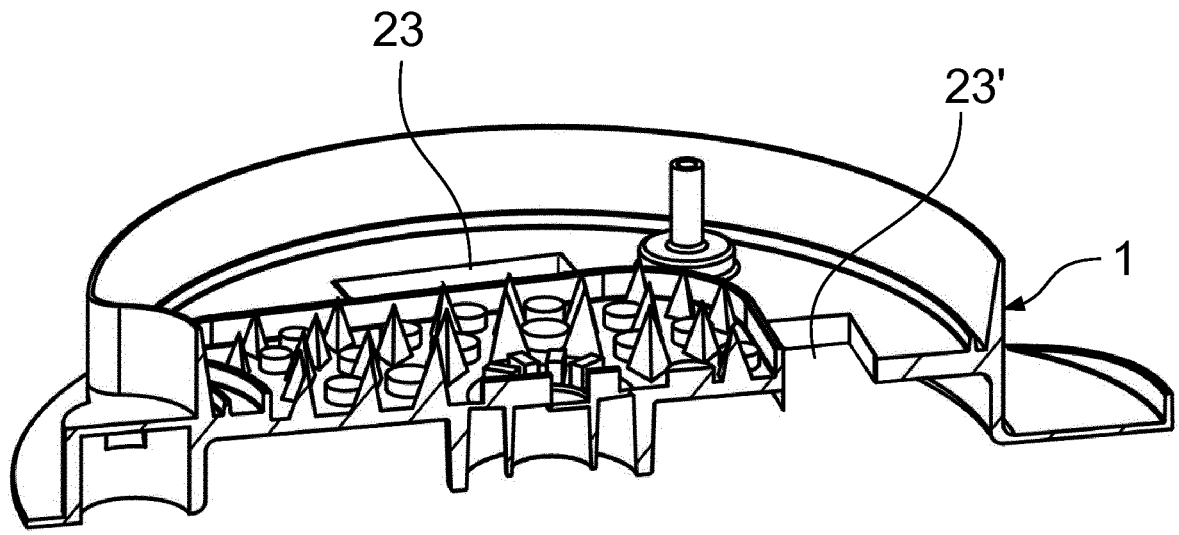
FIGS. 19 to 21 show various alternative embodiments of an adapter.
Figure 20:
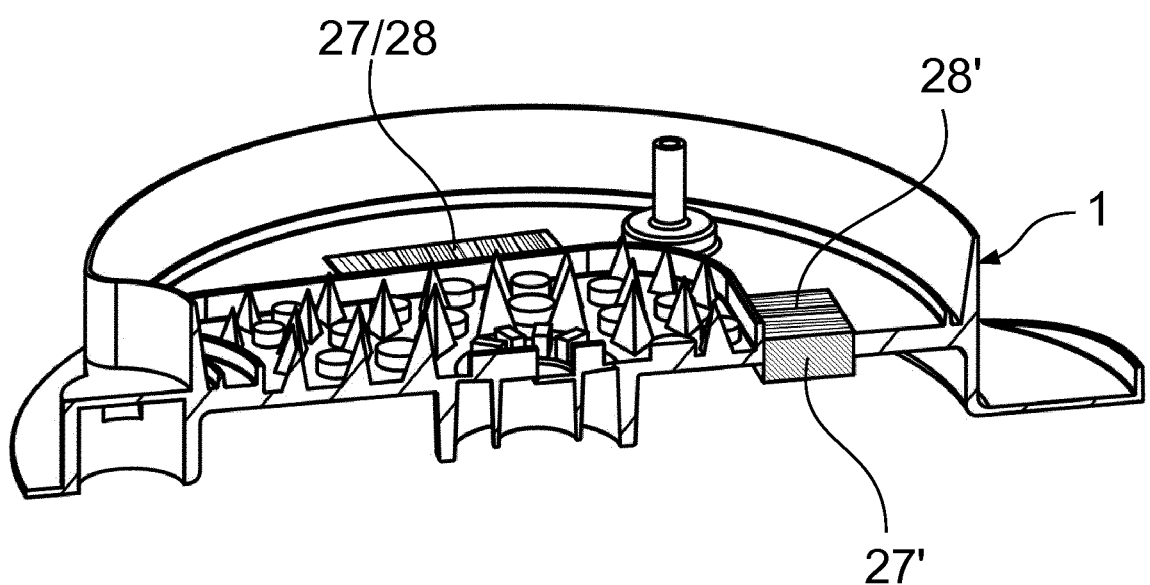
Figure 21:
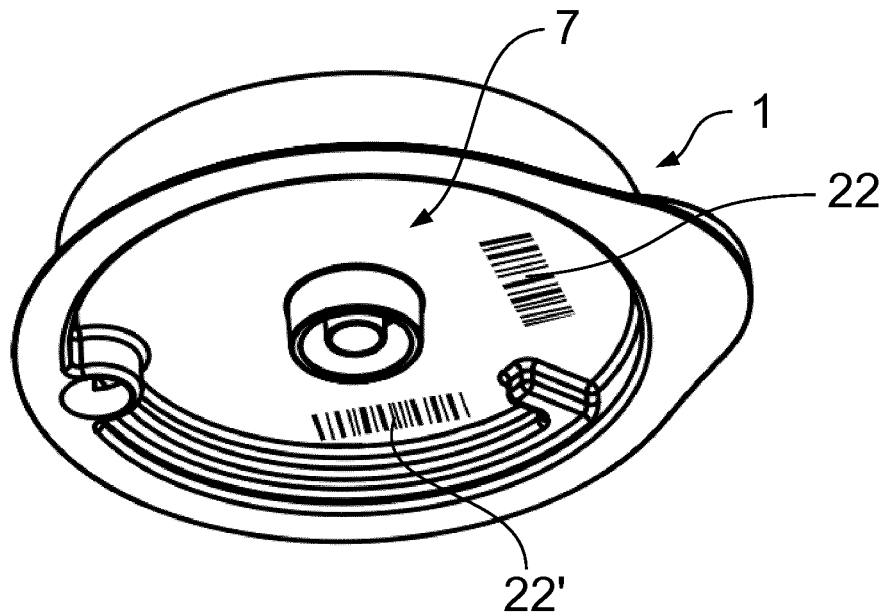

FIGS. 19 to 21 show alternative embodiments of an adapter 1. In the example according to FIG. 19, the adapter 1 has windows 23, 23' in the form of a recess, through which a machine-readable code mounted on the cover of the capsule can be read by the beverage preparation device when the adapter 1 is placed together with the capsule into the beverage preparation device. The example according to FIG. 20 shows an adapter 1 which, similarly to the exemplary embodiment according to FIGS. 1 to 18, has two transparent regions 22, 22' through which a machine-readable code can be read when the adapter is placed into the beverage preparation device. By contrast to the previously discussed exemplary embodiment (FIGS. 1 to 18), the machine-readable code 28, 28' here is not, however, printed on the capsule, but rather directly on the transparent regions 27, 27' of the adapter 1. In the exemplary embodiment according to FIG. 21, two machine-readable codes 22, 22' are printed directly onto the device side 7 of the adapter 1. In the exemplary embodiments shown, the machine-readable code 22 is an 1D code, namely a barcode. However, it goes without saying that the present invention is not restricted to such codes.

Figure 22:
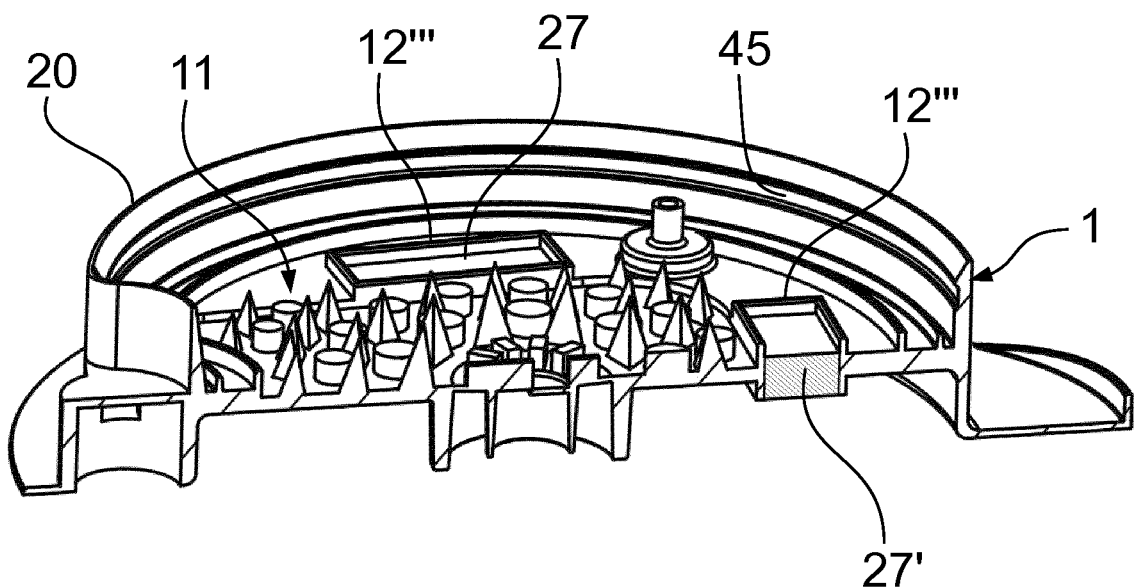
FIG. 22 shows a perspective sectional view of a further exemplary embodiment of an adapter.

FIG. 22 shows a further exemplary embodiment of an adapter 1 which is suitable for preassembly with a capsule 2 to form a set 47 (see FIG. 23) according to the invention. This adapter 1 is used with the example according to FIGS. 1 to 18. However, a sealing element 12' (see FIG. 1) is not arranged around the discharging region 11. Instead, the transparent regions 27, 27' are each surrounded by a sealing element 12'''. However, it goes without saying that the present invention is not restricted to an adapter 1 with sealing elements which surround either the discharging region 11 or the transparent regions 27, 27' or windows 23, 23' (see FIG. 19). An adapter which has both sealing elements which surround the discharging region 11 and sealing elements which surround the transparent regions 27, 27' or windows 23, 23' would also be conceivable. The encircling collar 20 of the adapter 1 has a latching means in the form of an encircling groove 45 in which a capsule 1 (see FIG. 23) can be accommodated in preassembled form in a standby position. Otherwise, the adapter is substantially identical to the previously described adapters, and therefore a detailed description is unnecessary.

Figure 23:
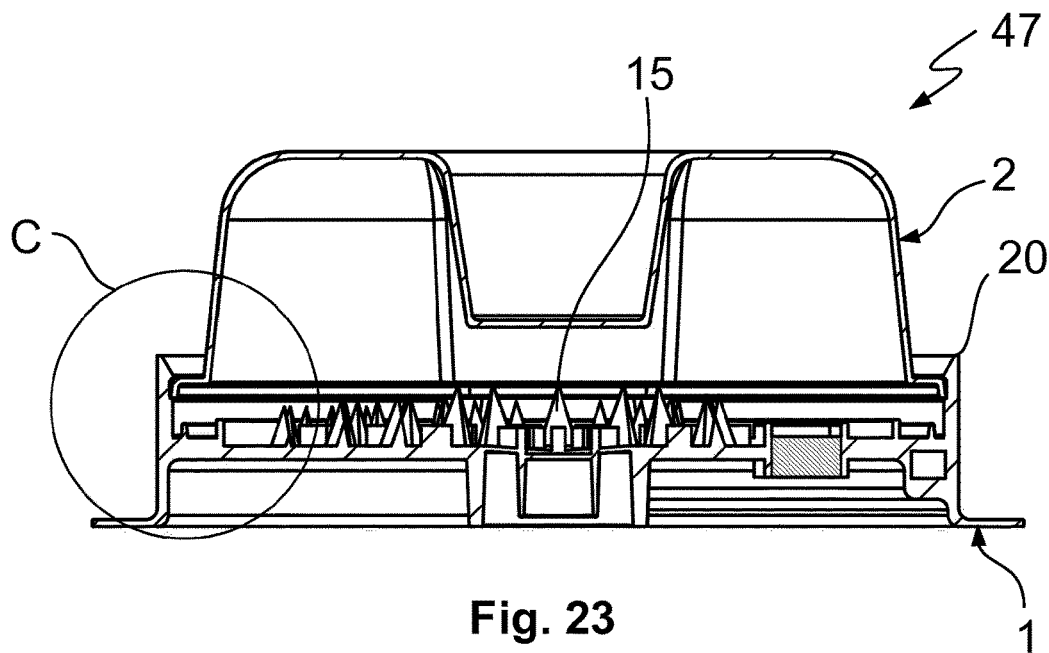
FIG. 23 shows a sectional view of a set according to the invention in the standby position, with the adapter according to FIG. 22.
Figure 24:
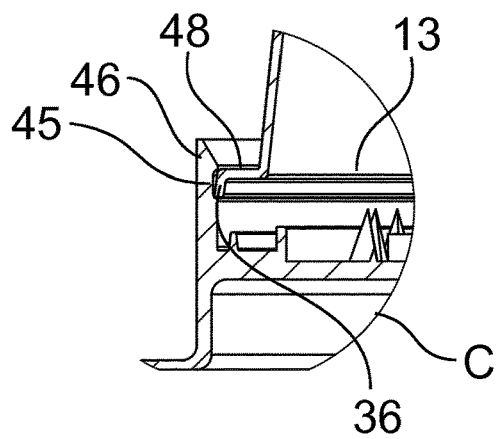
FIG. 24 shows an enlargement of the partial region C from FIG. 24.
Figure 26:
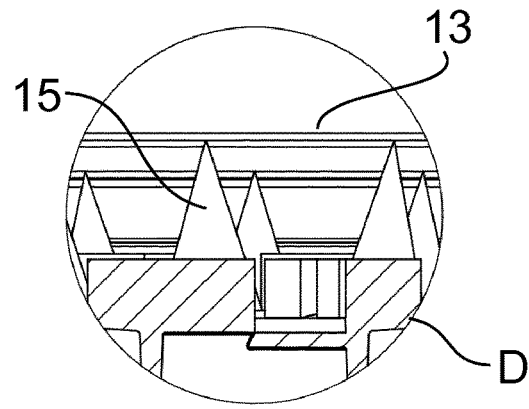
FIG. 26 shows an enlargement of the partial, region D from FIG. 25.
Figure 25:
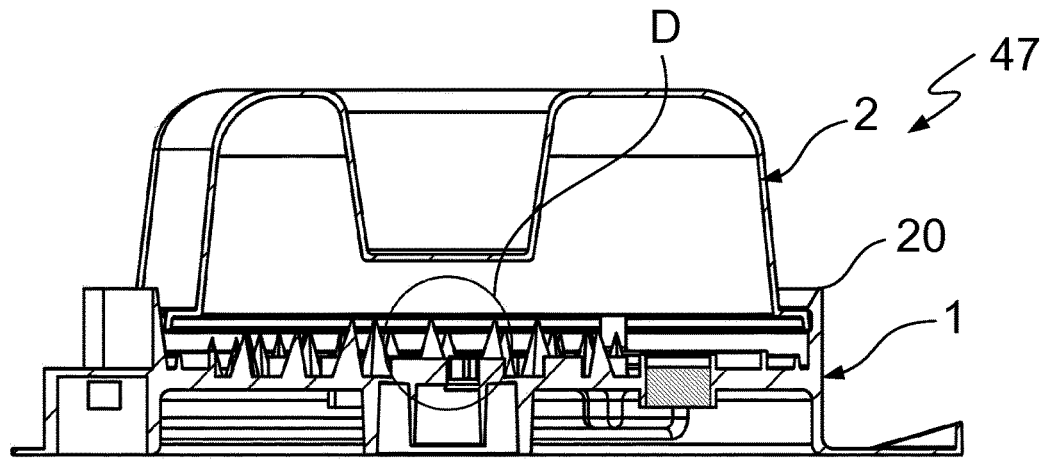
FIG. 25 shows a further sectional view of the set according to the invention in the standby position, with the adapter according to FIG. 22.

FIGS. 23 to 26 each depict a set 47 according to the invention in the standby position, wherein FIGS. 24 and 26 are enlarged detailed views of FIGS. 23 and 25. The capsule 2 is latched with its flange-like edge 48, in particular with its encircling extension 36, in the groove 45 of the encircling collar 20 of the adapter 1. In order to facilitate the preassembly of the set 47, i.e. the insertion of the capsule 2 into the adapter 1, the encircling collar 20 has an inflow region designed as a beveled latching lug 46. The cover 13 of the capsule 2 is arranged with respect to the pyramid-shaped penetration elements 15 in such a manner that the cover remains intact surd the capsule 2 continues to be closed. The cover 13 is penetrated only when the set 47 consisting of the capsule 2 and the adapter 1 is placed into the beverage preparation device and the device is closed. This situation of the operating position is illustrated in FIGS. 17 and 18, wherein the adapter 1 shown there does not nave a groove in the encircling collar.

Figure 27:
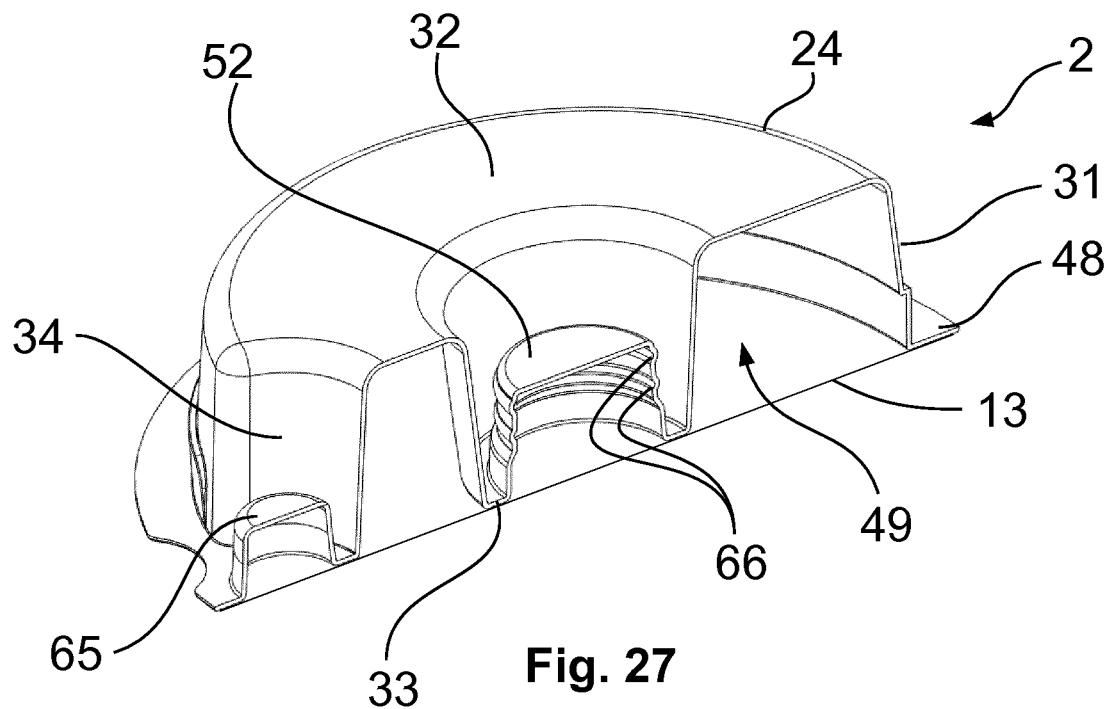
FIG. 27 shows a perspective sectional view of a further embodiment of a capsule.
Figure 28:
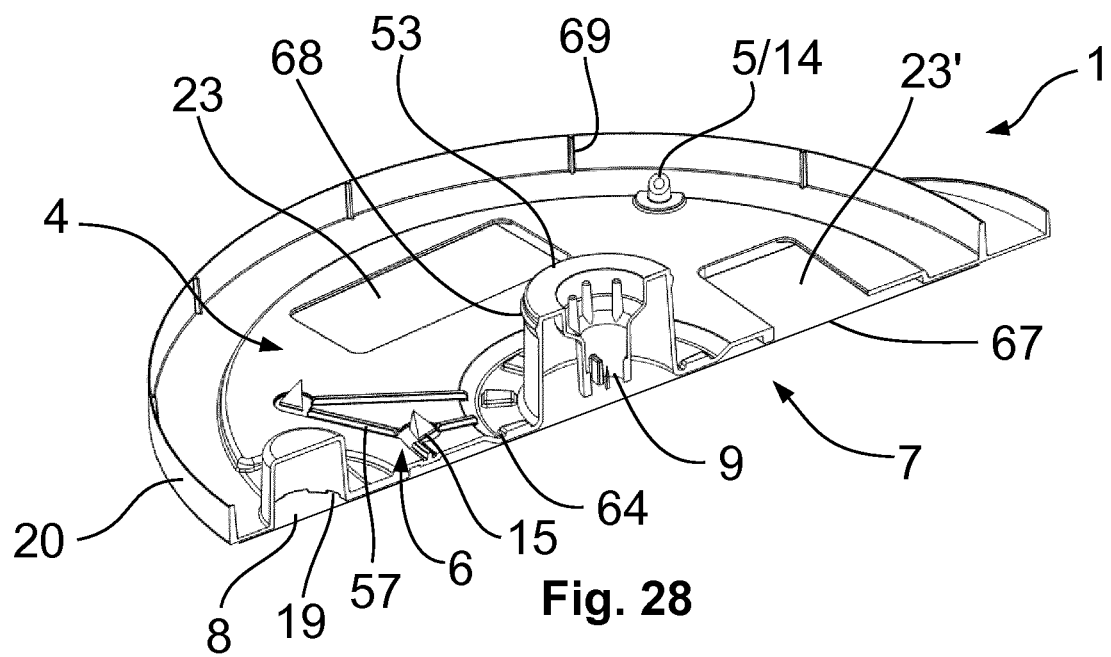
FIG. 28 shows a perspective sectional, view of a further adapter for preassembly as a set with the capsule from FIG. 27.
Figure 29:
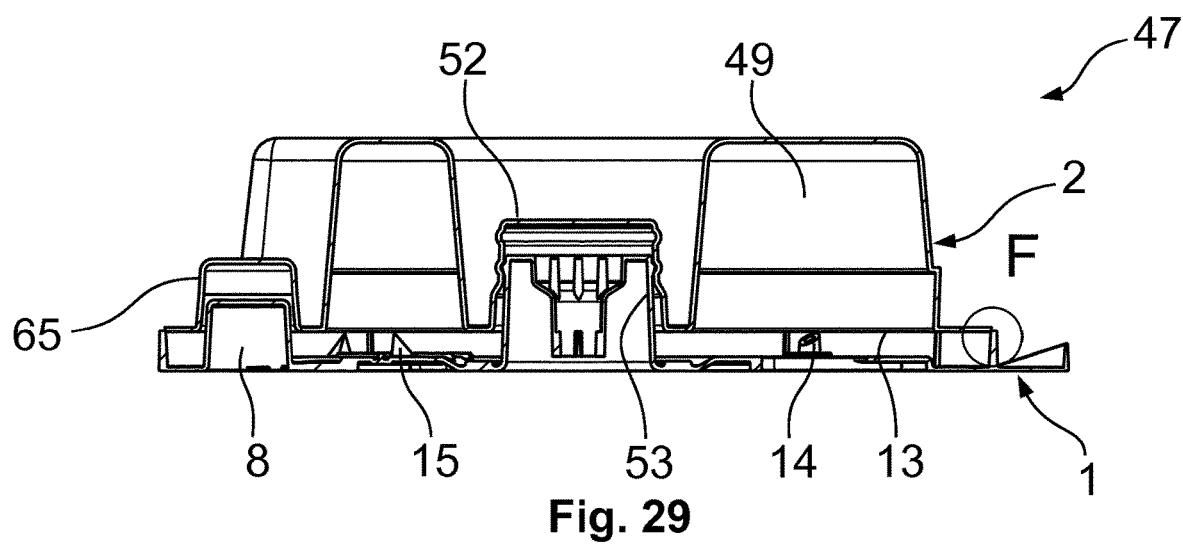
FIG. 29 shows a sectional view of a set according to the invention m the standby position with the capsule and the adapter according to FIGS. 27 and 28.
Figures 30, 32, 33:
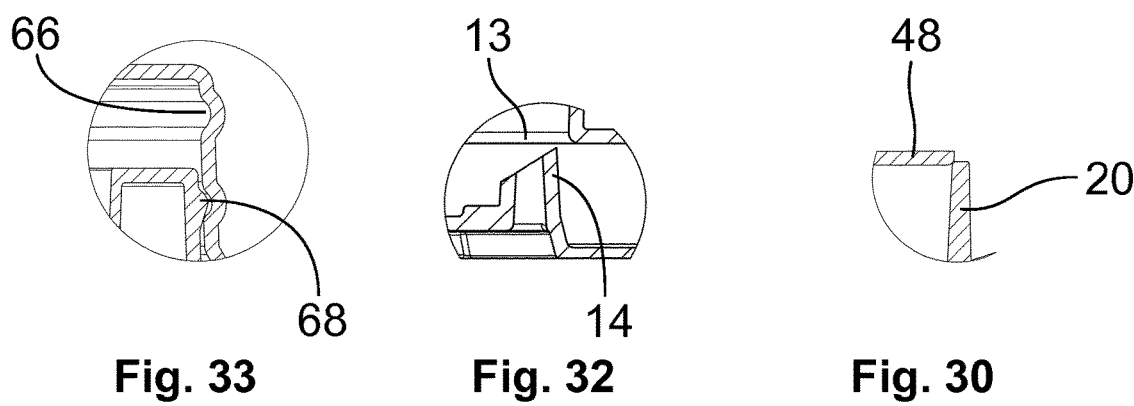
FIG. 30 snows an enlargement of the partial region F front FIG. 29.
FIG. 32 shows an enlargement of the partial, region E from FIG. 31.
FIG. 33 shows an enlargement, of the partial region H from FIG. 31.
Figure 31:
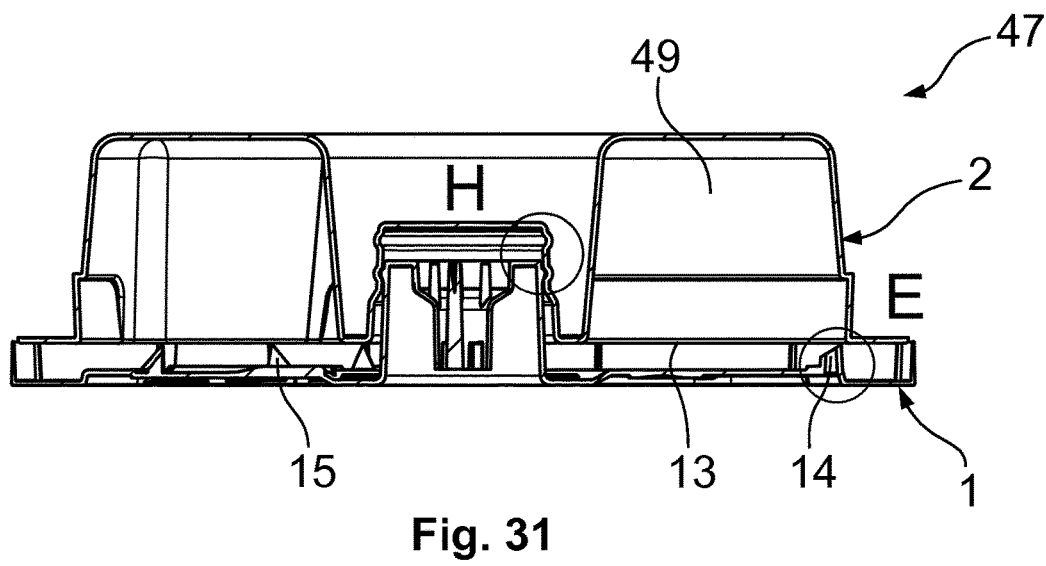
FIG. 31 shows a further sectional view of the set according to the invention from FIG. 29.

FIG. 27 illustrates a perspective sectional view of a further embodiment of a capsule 2. The capsule 2 comprised a capsule body 21 which has a base 32, a side wall 31 and a flange-like edge 48. The capsule body 24 is closed by a cover 13, and therefore a substance chamber 43 is formed in the inferior of the capsule body 24. The side wall 31 of the capsule body 24 has a recess 34. In said recess 34, a cup-like structure 65, which is likewise closed by the cover 13, is formed in the flange-like edge 43. There is no fluidic connection between said closed cup-like structure 65 and the substance chamber 43. In a central region of the capsule cup 24, an elevation 33 which is directed toward the cover and attends as far as the plane of the flange-like edge 48 is arranged in the base 32. The cover 13 is likewise fixedly connected to said elevation 33. Within said elevation 33, the capsule body 21 has an offset 52 which attends in turn in the direction of the capsule base 32. Said offset 52 is provided with two encircling flutes 66 on its inner wall. A beverage substance from which a beverage can be produced by supplying a liquid is accommodated (not illustrated) in the substance chamber 49. A machine-readable code (not shown) is mounted on the cover 13 of the capsule 2 in such a manner that it can be read by a reading device, FIG. 28 shows a perspective sectional view of an embodiment of an adapter 1 which is provided for preassembly as a set together with the capsule 2 from FIG. 27. On its capsule side 4 assigned to the capsule, the adapter 1 has an encircling collar 20, means 5 for introducing a liquid into a capsule and means 6 for discharging a liquid from the capsule. In addition, a central projection 53 with an outlet 9, i.e. a continuous connection from the capsule side 4 to the device side 7, can be seen. Said outlet 9 can correspond with an outlet stub of a beverage preparation device. In the upper region of its side wall, the projection 53 has an encircling rib 68 which can interact with a corresponding flute 66 (see FIG. 27) of a capsule. In addition, the encircling collar 20 of the adapter 1 has supporting structures 69 which support a capsule in a standby position.

Furthermore, the adapter 1 has two windows 23, 23' through which a machine-readable code arranged on a capsule can be read from the device side 7. Furthermore, an inlet 8 is formed which can correspond with an inlet stub of a beverage preparation device. The device side 7 of the adapter 1 is provided over its entire area with a closure cover 67 which in particular close the inlet 3 and the outlet 9. Between said closure cover 67 and the device side 7 of the adapter 1, a duct 19 is formed which fluidically connects tire inlet 8 of the adapter 1 to a puncture cannula 14, i.e. to the means for introducing a liquid into a capsule. The closure cover 67 is configured at least in the region of the windows 23, 23' in such a manner that a machine-readable code on a capsule arranged on the adapter can be read.

The means 5 for introducing a liquid into a capsule comprise the puncture cannula 14 which has a sharp-edged edge in order to be able to pierce a cover of a capsule. The means 6 for discharging a liquid from the capsule comprise a plurality of pyramids 15 and collecting channels 57 which connect individual pyramids 15 to one another and/or to a collecting duct 64 encircling the projection 53. The collecting channels 57 and the collecting duct 64 are configured in such a manner that they torn a closed fluid duct together with the cover of a capsule, if the latter is in the operating position on the adapter.

FIGS. 29 to 33 each illustrate a sectional view of a set 47 according to the invention in the standby position with the capsule 2 and the adapter 1 according to FIGS. 27 and 28. The sections in FIGS. 29 and 31 run approximately at right angles to each other in analogy to the sectional. Hates a and P of FIG. 2, FIGS. 30, 32 and 33 each depict enlarged views of specific details.

The capsule 2 is placed on the adapter 1 in the standby position. The cover 13 of the capsule 2 is intact in the region of the substance chamber 43, and therefore the substance chamber 49 is firmly closed. The cover 13 is pierced only in the regions of the cup-like structure 65 and in the region of the offset 52, and therefore the inlet 8 and the projection 53 of the adapter 1 engage in the capsule 2. The penetration elements of the adapter, namely the pyramids 15 and the puncture cannula 14, rest on the cover 13 or are even at a distance therefrom. The capsule 2 and the adapter 1 engage in each other at the offset 52 and projection 53, and the corresponding flutes 66 of the capsule 2 together with the rib 68 of the adapter 1 define the standby position or the operating position (see FIGS. 34 to 38). In addition, in the standby position, the flange-like edge 48 of the capsule 2 is supported on the encircling edge 20 of the adapter 1. For this purpose, the encircling edge can have individual supporting structures 63 (see FIG. 28) which, however, can be overcome when a brewing chamber of a beverage preparation device is closed and there is a corresponding rent a five movement between the capsule 2 and the adapter 1 into the operating position.

FIGS. 34 to 38 show the sane sectional views of the set 47 according so the invention as already illustrated in FIGS. 23 to 33, but the set 47 is in the operating position. The sectional, lines have been selected identically. The capsule 2 and the adapter 1 have been brought from the standby position, compare FIGS. 23 to 33, into the operating position by means of a relative movement. FIGS. 35, 37 and 38 in turn show enlarged views of specific details.

The capsule 2 rests flat on the capsule side 4 (see FIG. 28) of the adapter 1. The inlet 8 of the adapter 1 has been pushed completely into the cup-like structure 65 of the capsule 2. The rib 68 of the central projection 53 of the adapter 1 now lies in the second upper flute 66 of the offset 52 of the capsule 2. The flange-like edge 48 of the capsule 2 is no longer supported on the outer edge of the encircling collar 20 of the adapter 1, but rather likewise rests flat on the adapter 1. The puncture cannula 14 has pierced the cover 13 of the capsule 2, and, accordingly, a fluidic connection from the inlet 8 through the duct 19 (see FIG. 28) and the puncture cannula 14 into the substance chamber 49 has been produced. The pyramids 15 have also pierced the cover 13 of the capsule 2, and therefore a beverage formed in the substance chamber 49 can flow through the openings, which are provided by the pyramids 15, into the collecting channels 57 (see FIG. 28) and the collecting duct 64 (see FIG. 28).

Figure 39:
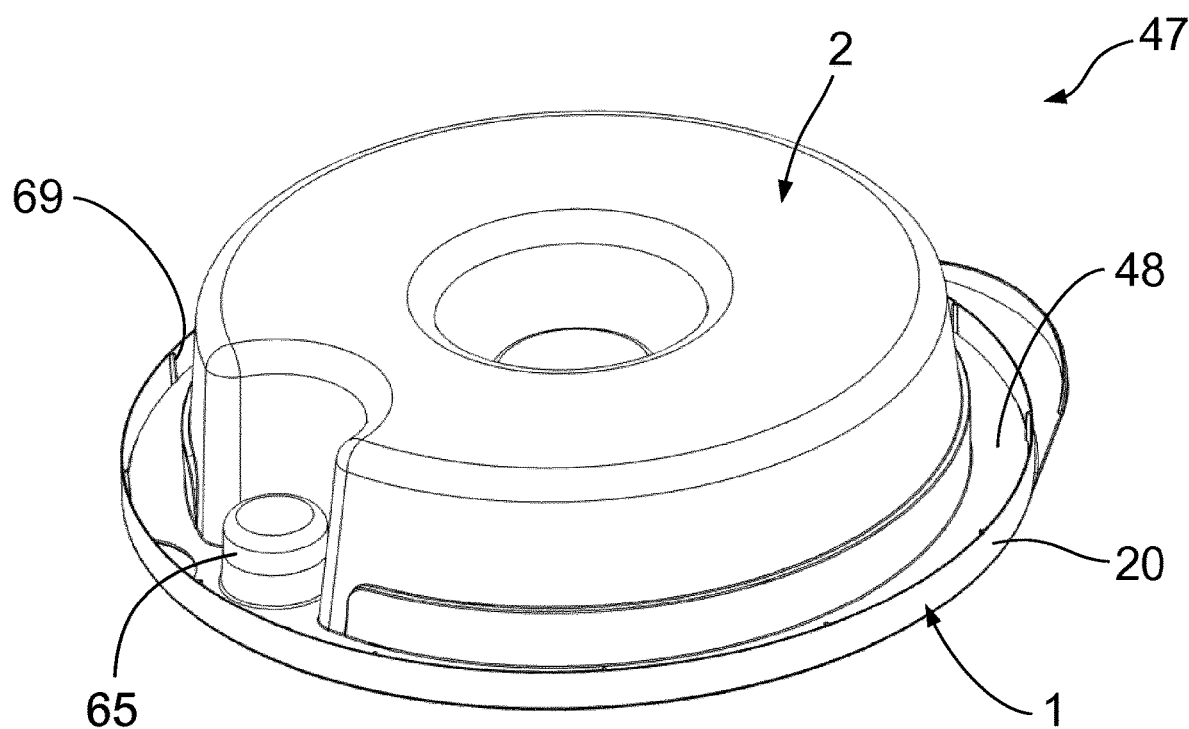
FIG. 39 shows a perspective illustration of the set according to the invention in the operating position according to FIG. 34.

FIG. 39 shows a perspective illustration of the set 77 according to the invention in the operating position according to FIG. 34. The capsule 2 no longer lies with its flange-like edge 48 on the outer edge of the encircling collar 20 of the adapter 1, but rather rests flat on the adapter 1. The supporting structure 69 on the encircling collar 20 have been overcome and are correspondingly visible. The cup-like structure 63 of the capsule 2 is aligned with the inlet 8 (see FIG. 34) and rests completely thereon.

Figure 40:
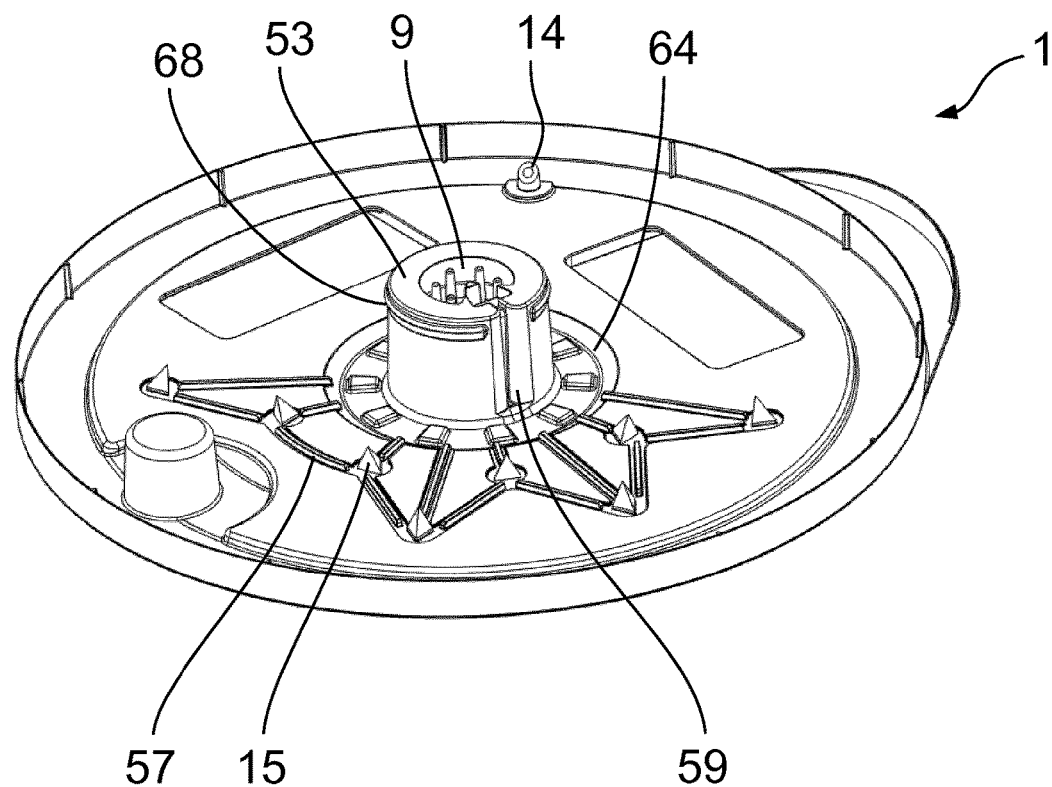
FIG. 40 shows a perspective illustration of the adapter from the set according to FIG. 33.

FIG. 40 shows a perspective illustration of the adapter 1 from the set according to FIG. 39 and corresponds to the adapter of FIG. 28. In this view of the entire adapter 1, a rising channel 59 can be seen laterally on the central projection 53, said rising channel being arranged starting from the collecting duct 64 of the side wall of the projection 53, said collecting duct encircling the central projection 53, to the upper end of said side wall. In the operating position, said rising channel 59 together with the capsule forms a rising duct 60 (see FIG. 42) through which the prepared beverage flows to the outlet 9. It is furthermore possible to see, on the capsule side 4, the means for introducing a liquid into a capsule are designed as a puncture cannula 14 and the means for discharging a liquid from the capsule are designed as pyramids 15. The pyramids 15 are connected to one another via the collecting channels 37 and are connected to the encircling collating duct 64. In the upper region of its side wall, the central projection 53 has the encircling rib 68 which, in interaction with the corresponding flutes 66 (see FIG. 27), defines the standby position and operating position. For the further details of the adapter 1, reference is made to FIG. 28.

Figure 41:
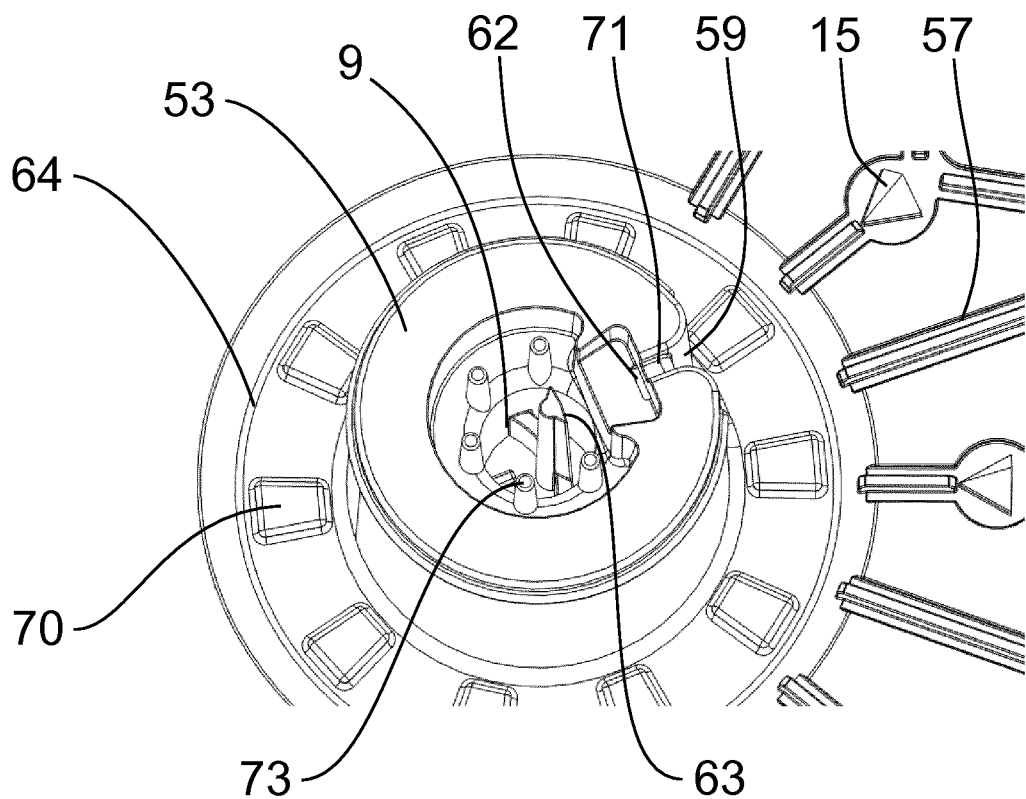
FIG. 41 shows an enlarged perspective view of a central projection of the adapter according to FIG. 40.

FIG. 41 depicts an enlarged perspective view of the central projection 53 of the adapter according to FIG. 40. The view is restricted to the projection 53, the encircling collecting duct 64 with its collecting channels 57 and a number of pyramids 15. Supporting surfaces 70 which protrude from the collecting duct and prevent closing of the collecting duct 64 by the capsule placed thereon in the operating position are formed in the encircling collecting duct 64. The rising channel 55 which, together with the capsule placed thereon in the operating position, forms a rising duct 60 (see FIG. 42) can likewise be seen.

The collecting channel 59 opens at the upper end, i.e. at its end opposite the collecting duct 64, into the outlet 9 of the adapter. As can be seen, the collecting duct 53 before opening into the outlet 9 passes through an outlet nozzle 71, and therefore a beverage jet is formed in operation. Said beverage jet is guided via a step and an air inlet opening 62 arranged in said step, so that the beverage jet can entrain air for improved frothing. An impact wall 63 which brings about homogeneous mixing with air and promotes the frothing is additionally arranged in the outlet 9. Also arranged in the outlet 9 are five supporting posts 73 which influence the frothing and reduce the core size of the froth.

Figure 42:
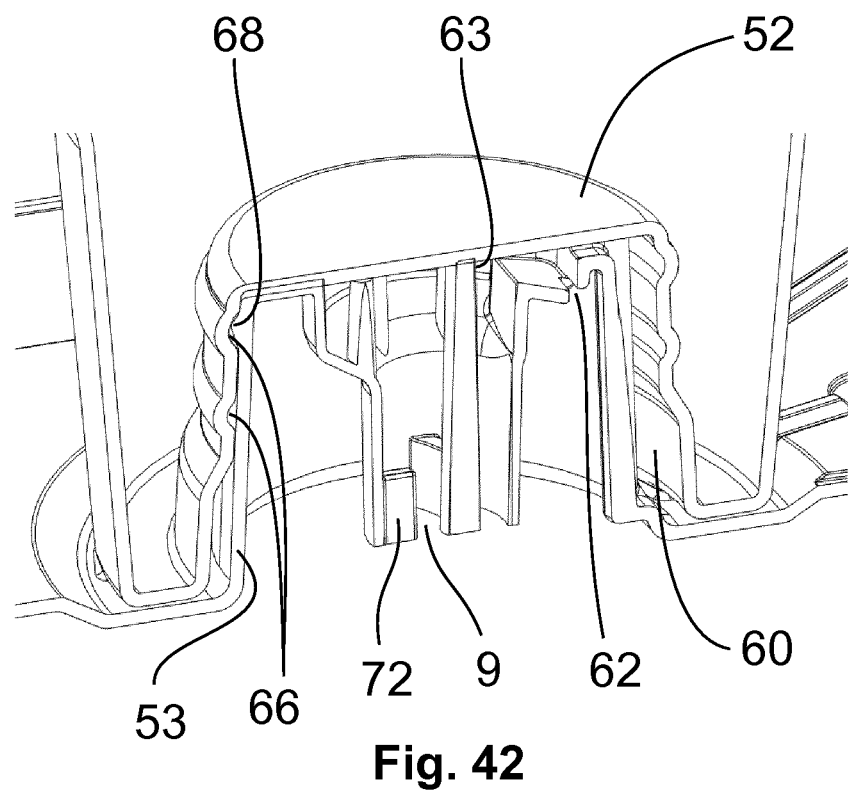
FIG. 42 shows an enlarged perspective sectional view of the outlet of the set according to FIG. 33.

FIG. 42 shows an enlarged perspective sectional view of the outlet 9 of the set according to FIG. 39, wherein the sectional plane runs through the rising channel 99 (see FIG. 11) and therefore through the rising duct 60 formed from rising channel and offset 52 of the capsule. The offset 52 of the capsule is latched with one of its two flutes 66 to the rib 68 of the projection 53 of the adapter in the operating position. The rising duct 62 which is formed by the rising channel and the projection of the capsule opens into the outlet 9, wherein a beverage jet formed by the outlet nozzle 71 (see FIG. 41) is guided via the air inlet opening 62 and subsequently strikes against the impact wall 63. Air can be entrained through the air inlet opening 62 into the beverage jet, said air being homogeneously mixed with the beverage at the impact wall 63, thus forming a froth. In addition to the impact wall 63, the outlet 9 is provided with steering wings 72 which shape and/or additionally homogenize the beverage jet emerging through the outlet 9 from the set consisting of adapter and capsule.

Figure 43A:
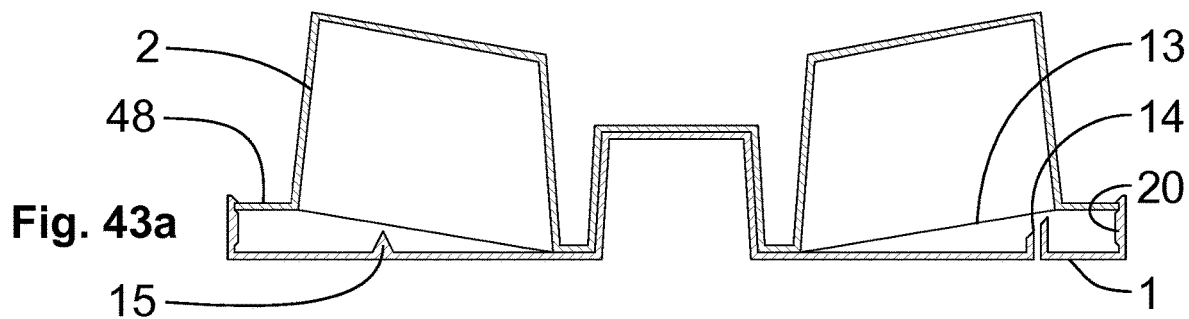
FIGS. 43a, 43b show a schematic illustration of an alternative embodiment of the change from the standby position into the operating position.
Figure 43B:
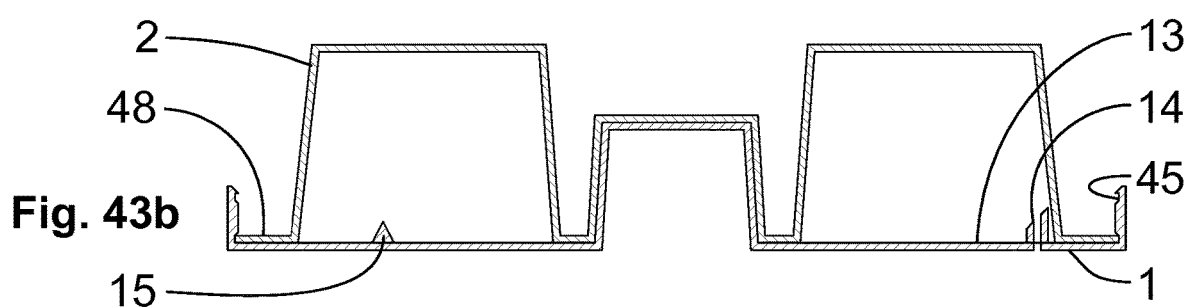
Figure 44A:
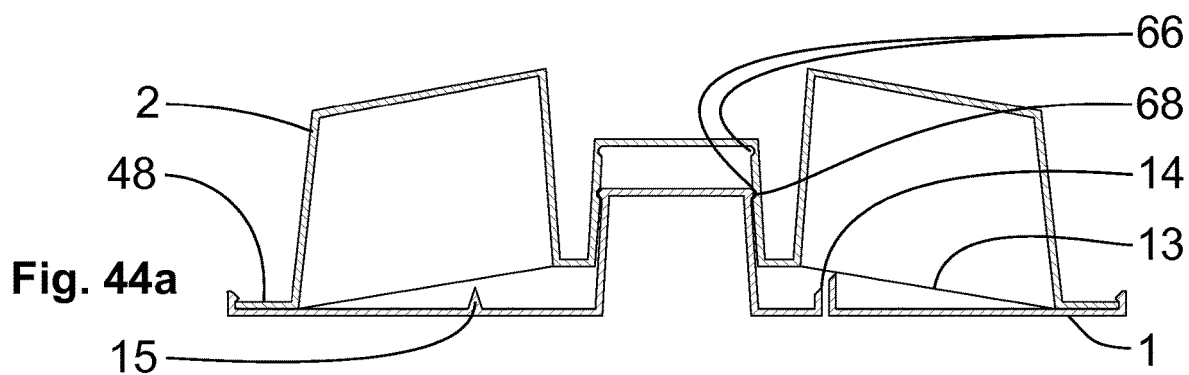
FIGS. 44a, 44b show a further schematic illustration of an alternative embodiment of the change from the standby position into the operating position.
Figure 44B:
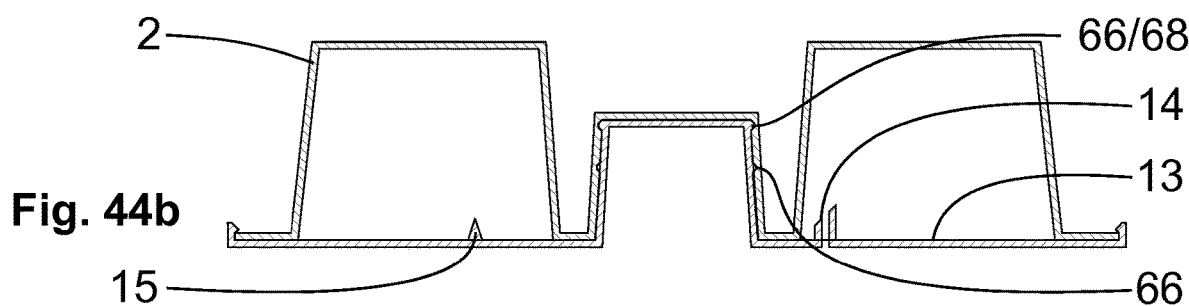

FIGS. 43a and 43b and 44a and 44b illustrate, in each case in a schematic illustration, an alternative embodiment of the change of a capsule and adapter set from the standby position info the operating position. In FIGS. 43a and 44a, the set is in each case illustrated in the standby position, and in FIGS. 43b and 44b is illustrated in each case in the operating position.

In FIGS. 43a and 43b, the capsule 2 is preassembled on the adapter 1 in such a-manner that the capsule 2 in the central region already rests completely on the adapter 1. In the edge region, i.e. at the flange-like edge 48, the capsule 1 is preassembled in a groove 45 of the encircling collar 20 of the adapter 1 in the standby position. The cover 13 of the capsule 2 is intact and closes the capsule 2. A puncture cannula 14 for introducing a liquid from the adapter 1 into the capsule 2 is spaced apart from the cover 13. Similarly, a pyramid 15 for discharging the liquid from the capsule 2 is spaced apart from the cover 13. Only in the operating position of FIG. 43b does the flange-fife edge 48 of the capsule 2 also rest flat on the adapter 1 such that the cover 43 is penetrated by the puncture cannula 14 and the pyramid 15.

FIGS. 44a and 44b illustrate an alternative embodiment, in the standby position of which the capsule 2 in its central region does not yet rest on the adapter 1. Only the flange-like edge 48 of the capsule 2 rests flat on the adapter 1. In the standby position, the capsule 2 is held in the central region by a flute 66 in the offset, said flute corresponding with a rib 68 in the projection of the adapter 1. Accordingly, the cover 13 is intact and is spaced apart from a pyramid 15 for discharging a liquid from the capsule 2 and from a puncture cannula 14 for introducing a liquid into the capsule 2. Only in the operating position according to FIG. 44b does the capsule 2 also rest in its central region on the adapter 4. The rib 68 of the adapter engages in the second flute 66 of the capsule 2. The cover 13 is penetrated by the puncture cannula 14 and the pyramid.

The invention claimed is:
1. A set for use in the preparation of a beverage in a beverage preparation device, the set comprising:
a capsule and an adapter,
the capsule comprising a capsule body with an in particular flange-like edge, a cover which is attached to the flange-like edge and closes the capsule body in order to form a substance chamber,
wherein, in the substance chamber, the capsule contains a substance for the preparation of the beverage;
the adapter has a capsule side and a device side,
the adapter further compromise means for introducing a liquid into the capsule and means for discharging a liquid from the capsule, said means for introducing and discharging being arranged on the capsule side of the adapter,
the adapter further comprises an inlet for a liquid prepared by the beverage preparation device and also an outlet, said inlet and said outlet being arranged on the device side of the adapter;
wherein the means for introducing a liquid into the capsule and the means for discharging a liquid from the capsule are arranged such that both the introduction of liquid into the capsule and the discharging of same from the capsule take place on only one side of the capsule;
wherein the inlet is fluidically connected to the means for introducing the liquid into the capsule and the outlet is fluidically connected to the means for discharging the liquid from the capsule, and
the adapter and the capsule are connected to each other in a standby position in such a manner that the adapter and the capsule can be brought out of the standby position into an operating position, in which the inlet of the adapter and the substance chamber of the capsule are fluidically connected to each other.

2. The set according to claim 1, wherein, in the standby position, the cover of the capsule is held at a distance from the capsule side of the adapter in such a manner that the means for introducing the liquid into the capsule and the means for discharging the liquid from the capsule cannot communicate with the substance chamber of the capsule.

3. The set according to claim 1, wherein the adapter is held on the capsule by latching means.

4. The set according to claim 3, wherein the adapter has an entirely or partially encircling groove in which the flange-like edge of the capsule is at least one of latched or pressed.

5. The set according to claim 3, wherein a center of the capsule body has an offset at which the capsule is latched to a corresponding projection on the adapter.

6. The set according to claim 1, wherein the adapter is held on the capsule by at least one of a frictional connection, welding, adhesive bonding, sealing or via predetermined breaking points or by a combination thereof.

7. The set according to claim 1, wherein the adapter is preassembled on the capsule in such a manner that adapter and the capsule can be pressed, under action of a pressing force, from the standby position into the operating position in which adapter and the capsule can fluidically communicate with one another.

8. The set according to claim 1, wherein penetration elements are arranged on the capsule side of the adapter, and said penetration elements are directed toward the cover of the capsule in order to produce at least one opening in the cover in the operating position.

9. The set according to claim 1, wherein the means for introducing the liquid into the capsule, on the capsule side of the adapter, comprise at least one puncture cannula with which the cover of the capsule can be penetrated in the operating position.

10. The set according to claim 5, wherein the projection of the adapter has a rising channel which, in the operating position, together with the corresponding offset of the capsule, forms a rising duct which is connected to the outlet of the adapter.

11. The set according to claim 10, wherein the rising duct is configured in such a manner that, together with the offset of the capsule, the rising duct forms an outlet nozzle for forming a beverage jet.

12. The set according to claim 11, wherein an air inlet opening is arranged in the region of the outlet nozzle in such a manner that the beverage jet entrains air.

13. The set according to claim 11, wherein the adapter has, in the outlet, an impact wall toward which the outlet nozzle is directed.

14. The set according to claim 1, wherein the capsule body is a thermoformed part or an injection molded part, and the adapter is an injection molded part.

15. A beverage preparation system comprising a set according to claim 1 and a beverage preparation device.

* * * * *